(12) United States Patent
Tang et al.

(10) Patent No.: US 11,468,285 B1
(45) Date of Patent: Oct. 11, 2022

(54) ANALYSIS OF OBJECTS OF INTEREST IN SENSOR DATA USING DEEP NEURAL NETWORKS

(71) Applicant: Apple Inc., Cupertino, CA (US)

(72) Inventors: Yichuan Tang, Sunnyvale, CA (US); Nitish Srivastava, San Francisco, CA (US); Ruslan Salakhutdinov, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 1144 days.

(21) Appl. No.: 15/606,875

(22) Filed: May 26, 2017

Related U.S. Application Data

(60) Provisional application No. 62/343,071, filed on May 30, 2016, provisional application No. 62/343,082, filed on May 30, 2016, provisional application No. 62/343,080, filed on May 30, 2016, provisional application No. 62/343,077, filed on May 30, 2016.

(51) Int. Cl.
| | | |
|---|---|---|
| *G06N 3/04* | (2006.01) | |
| *G06T 7/20* | (2017.01) | |
| *H04N 5/14* | (2006.01) | |
| *G01S 17/89* | (2020.01) | |
| *G06F 16/432* | (2019.01) | |
| *B60W 30/08* | (2012.01) | |

(52) U.S. Cl.
CPC ............ *G06N 3/0445* (2013.01); *G01S 17/89* (2013.01); *G06F 16/434* (2019.01); *G06T 7/20* (2013.01); *H04N 5/144* (2013.01); *B60W 30/08* (2013.01); *B60W 2420/42* (2013.01); *B60W 2420/52* (2013.01)

(58) Field of Classification Search
CPC ..... G06N 3/0445; G06F 16/434; G01S 17/89; G06T 7/20; H04N 5/144; B60W 30/08; B60W 2420/42; B60W 2420/52
See application file for complete search history.

(56) References Cited

U.S. PATENT DOCUMENTS

| | | | |
|---|---|---|---|
| 6,449,384 B2* | 9/2002 | Laumeyer | G06K 9/00818 |
| | | | 382/104 |
| 9,760,806 B1* | 9/2017 | Ning | G06K 9/00791 |
| 9,984,466 B1* | 5/2018 | Duran | G06T 7/292 |
| 2013/0238183 A1* | 9/2013 | Goulding | B25J 5/00 |
| | | | 701/26 |

(Continued)

OTHER PUBLICATIONS

Garcia et al., "Motion Prediction of Regions Through the Statistical Temporal Analysis Using an AutoRegressive Moving Average (ARMA) Model", 2014, Research in Computing Science 77 (2014), pp. 9-20 (Year: 2014).*

(Continued)

*Primary Examiner* — Brent Johnston Hoover
(74) *Attorney, Agent, or Firm* — Robert C. Kowert; Kowert, Hood, Munyon, Rankin & Goetzel, P.C.

(57) ABSTRACT

Sensor data captured by one or more sensors may be received at an analysis system. A neural network may be used to detect an object in the sensor data. A plurality of polygons surrounding the object may be generated in one or more subsets of the sensor data. A prediction of a future position of the object may be generated based at least in part on the polygons. One or more commands may be provided to a control system based on the prediction of the future position.

20 Claims, 20 Drawing Sheets

(56) References Cited

U.S. PATENT DOCUMENTS

| | | | |
|---|---|---|---|
| 2016/0362050 A1* | 12/2016 | Lee | G06K 9/00805 |
| 2017/0015312 A1* | 1/2017 | Latotzki | B62D 15/027 |
| 2017/0219353 A1* | 8/2017 | Alesiani | G05D 1/0212 |

OTHER PUBLICATIONS

Wang et al., "Visual Tracking with Fully Convolutional Networks", 2015, The IEEE International Conference on Computer Vision (ICCV), 2015, pp. 3119-3127 (Year: 2015).*

Hoffman, "Perception through visuomotor anticipation in a mobile robot", 2007, Neural Networks 20 (2007), pp. 22-33 (Year: 2007).*

Foka et al., "Probabilistic Autonomous Robot Navigation in Dynamic Environments with Human Motion Prediction", Jan. 6, 2010, Int J Soc Robot (2010) 2, pp. 79-94 (Year: 2010).*

Vinod Nair, et al., "Rectified Linear Units Improve Restricted Boltzmann Machines," Appearing in Proceedings of the 27th International Conference on Machine Learning, Haifa, Israel, 2010, Copyright 2010 by the author(s)/owner(s). pages 1-8.

Misha Denil, et al, "Learning where to Attend with Deep Architectures for Image Tracking," Cite as: arXiv:1109.3737 Sep. 16, 2011, pp. 1-30.

Alex Graves, "Generating Sequences With Recurrent Neural Networks," Jun. 5, 2014, pp. 1-43. arXiv:1308.0850v5 [csNE].

Volodymyr Mnih, et al., "Recurrent Models of Visual Attention," Part of: Advances in Neural Information Processing Systems 27 (NIPS 2014), Jun. 24, 2014, pp. 1-12.

Dzmitry Bahdanau, et al., "Neural Machine Translation By Jointly Learning to Align and Translate," Published as a conference paper at ICLR 2015, pp. 1-15.

Karol Gregor, et al., "Draw: A Recurrent Neural Network for Image Generation," Proceedings of the 32nd International Conference on Machine Learning, Lille, France, 2015. JMLR: W&CP vol. 37. Copyright 2015 by the authors). May 20, 2015, pp. 1-10.

Kelvin Xu, et al., "Show, Attend and Tell: Neural Image Caption Generation with Visual Attention," Proceedings of the 32 nd International Conference on Machine Learning, Lille, France, 2015. JMLR: W&CP vol. 37. Copyright 2015 by the authors).Apr. 19, 2016, pp. 1-22.

Shikhar Sharma, et al., "Action Recognition Using Visual Attention," Workshop track—ICLR 2016, Feb. 14, 2016, pp. 1-11.

Hugo Larochelle, et al., "Learning to combine foveal glimpses with a third-order Boltzmann machine," Part of: Advances in Neural Information Processing Systems 23, Curran Associates, Inc., 2010, pp. 1-9.

Max Jaderberg, et al., "Spatial Transformer Networks," Part of: Advances in Neural Information Processing Systems 28 (NIPS 2015) pp. 1-9.

Ruslan Salakhutdinov, et al., "Deep Boltzmann Machines," Appearing in Proceedings of the 12th International Conference on Artificial Intelligence and Statistics (AISTATS) 2009, Clearwater Beach, Florida, USA. vol. 5 of JMLR:W&CP 5. Copyright 2009 by the authors. pp. 1-8.

Ross Girshick, "Fast R-CNN," The IEEE International Conference on Computer Vision (ICCV), 2015, pp. 1440-1448.

Yichuan Tang, et al., "Learning Generative Models with Visual Attention," Part of: Advances in Neural Information Processing Systems 27 (NIPS 2014) pp. 1-9.

Serena Yeung, et al,. "Every Moment Counts: Dense Detailed Labeling of Actions in Complex Videos," CoRR, abs/1507.05738, 2015. pp. 1-10.

David P. Reichert, et al., "A Hierarchical Generative Model of Recurrent Object-Based Attention in the Visual Cortex," in ICANN (1), vol. 6791, pp. 18-25. Springer, 2011. pp. 1-8.

Paul Viola, et al., "Rapid Object Detection using a Boosted Cascade of Simple Features," in IEEE Conf. on Computer Vision and Pattern Recognition, 2001, pp. 1-9.

Girshick, R., Donahue, J., Darrell, T., and Malik, J. Region-based convolutional networks for accurate object detection and semantic segmentation. IEEE Trans. Pattern Analysis and Machine Intelligence, May 2015. Craves, Alex. Generating sequences with recurrent neural networks. CoRR, abs/1308.0850, 2013. pp. 1-16.

Tsotsos, J. K., Culhane, S. M., Wai,W. Y. K., Lai, Y. H., Davis, N., and Nuflo, F. Modeling visual-attention via selective tuning. Artificial Intelligence, 78(1-2):507-545, Oct. 1995.

Burda, Y., Grosse, R., and Salakhutdinov, R. Importance-weighted Autoencoders. International Conference an Learning Representations, 2016.

Cho, Kyunghyun, van Merrienboer, Bart, G̃ulc,ehre, C, aglar, Bahdanau, Dzmitry, Bougares, Fethi, Schwenk, Holger, and Bengio, Yoshua. Learning phrase representations using RNN encoder-decoder for statistical machine translation. In Proceedings of the 2014 Conference on Empirical Methods in Natural Language Processing, EMNLP 2014, pp. 1724-1734, 2014.

Goodfellow, I., Pouget-Abadie, J., Mirza, M., Xu, B., Warde-Farley, D., Ozair, S., Courville, A., and Bengio, Y. Generative adversarial nets. In Neural Information Processing Systems, 2014.

Hurri, Jarmo and Hyvarinen, Aapo. Simple-cell-like receptive fields maximize temporal coherence in natural video. Neural Computation, 15(3):663-691, 2003Massachusetts Institute of Technology.

Denton, Emily L., Chintala, Soumith, Szlam, Arthur, and Fergus, Robert. Deep generative image models using a aplacian pyramid of adversarial networks. In NIPS, 2015, pp. 1-9.

Kingma, D. P. and Welling, M. "Auto-Encoding Variational Bayes". International Conference on Learning Representations, 2014, pp. 1-14.

Rezende, D. J., Mohamed, S., and Wierstra, D. "Stochastic backpropagation and approximate inference in deep generative models". International Conference on Machine Learning, pp. 1278-1286, 2014.

Sutskever, Ilya, Vinyals, Oriol, and Le, Quoc V. V. "Sequence to sequence learning with neural networks". In Advances in Neural Information Processing Systems 27, pp. 3104-3112. 2014.

Ranzato, Marc'Aurelio, Szlam, Arthur, Bruna, Joan, Mathieu, Michael, Collobert, Ronan, and Chopra, Sumit. "Video (language) modeling: a baseline for generative models of natural videos". CoRR, abs/1412.6604, 2014, pp. 1-15.

Srivastava, N., Mansimov, E., and Salakhutdinov, R. "Unsupervised learning of video representations using LSTMs". ICML, 2015, pp. 1-12.

Sukhbaatar, Sainbayar, Szlam, Arthur, Weston, Jason, and Fergus, Rob. "End-to-end memory networks". In Advances in Neural Information Processing Systems. 2015, pp. 1-11.

Radford, Alec, Metz, Luke, and Chintala, Soumith. "Unsupervised representation learning with deep convolutional generative adversarial networks" International Conference on Learning Representations, 2016, pp. 1-16.

Hochreiter, Sepp and Schmidhuber, J̃urgen. "Long short-term memory". Neural Computation, 1997, pp. 1-32.

Krizhevsky, Alex, Sutskever, Ilya, and Hinton, Geoffrey. "Imagenet classification with deep convolutional neural networks". In Advances in Neural Information Processing Systems. 2012, pp. 1-9.

Michalski, Vincent, Memisevic, Roland, and Konda, Kishore. "Modeling deep temporal dependencies with recurrent grammar cells". In Advances in Neural Information Processing Systems 27, pp. 1925-1933. Curran Associates, Inc., 2014.

Karpathy, Andrej, Toderici, George, Shetty, Sanketh, Leung, Thomas, Sukthankar, Rahul, and Fei-Fei, Li. "Large-scale video classification with convolutional neural networks". In CVPR, 2014, pp. 1-8.

Le, Q. V., Zou, W., Yeung, S. Y., and Ng, A. Y. "Learning hierarchical spatio-temporal features for action recognition with independent subspace analysis" In CVPR, 2011, pp. 3361-3368.

Susskind, J., Memisevic, R., Hinton, G., and Pollefeys, M. "Modeling the joint density of two images under a variety of transformations". In Proceedings of IEEE Conference on Computer Vision and Pattern Recognition, 2011, pp. 2793-2800.

Van Hateren, J. H. and Ruderman, D. L. "Independent component analysis of natural image sequences yields spatio-temporal filters similar to simple cells in primary visual cortex". Proceedings. Biological sciences / The Royal Society, 265(1412):2315-2320, 1998.

(56) References Cited

OTHER PUBLICATIONS

Shimodaira, Hidetoshi. "Improving predictive inference under covariate shift by weighting the log-likelihood function". Journal of statistical planning and inference, 90(2):227 244, 2000.
Bickel, Steffen, Brckner, Michael, and Scheffer, Tobias. "Discriminative learning for differing training and test distributions". In in ICML, pp. 81-88. ACM Press, 2007.
Cortes, C., Mohri, M., Riley, M., and Rostamizadeh, A. "Sample selection bias correction theory". In ALT, 2008, pp. 1-16.
Baxter, J. "A model of inductive bias learning". Journal of Artificial Intelligence Research, 12:149-226, 2000.
Ioffe, Sergey and Szegedy, Christian. "Batch normalization: Accelerating deep network training by reducing internal covariate shift". In Proceedings of the 32nd International Conference on Machine Learning, ICML 2015, Lille, France, Jul. 3-11, 2015, pp. 448-456, 2015.
Ben-David, S., Blitzer, J., Crammer, K., and Pereira, F. "Analysis of representations for domain adaptation". In NIPS, 2007, pp. 1-8.
Huang, J., Smola, A., Gretton, A., Borgwardt, K., and Schoelkopf, B. "Correcting sample selection bias by unlabeled Tata" In NIPS, 2007, pp. 1-8.
Daume, III, Hal and Marcu, Daniel. "Domain adaptation for statistical classifiers". Journal of Artificial Intelligence Research 26 (2006) 101-126.
Jiang, J. and Zhai, C. "Instance weighting for domain adaptation in NLP". In ACL, 2007, pp. 1-8.
Xue, G., Dai, W., Yang, Q., and Yu, Y. "Topic-bridged PLSA for cross-domain text classification". In SIGIR, 2008, pp. 1-8.
Bengio, Y. "Learning deep architectures for AI". Foundations and Trends in Machine Learning, 2009, pp. 1-130.
Larochelle, H., Bengio, Y., Louradour, J., and Lamblin, P. "Exploring strategies fortraining deep neural networks". Journal of Machine Learning Research, 10:1-40, 2009.
Guo, Honglei, Zhu, Huijia, Guo, Zhili, Zhang, Xiaoxun, Wu, Xian, and Su, Zhong. Domain adaptation with latent semantic association for named entity recognition. In NAACL, 2009, pp. 281-289.
Huang, F. and Yates, A. "Distributional representations for handling sparsity in supervised sequence-labeling". In ACL, 2009, pp. 495-503.
Blitzer, J., McDonald, R., and Pereira, F. "Domain adaptation with structural correspondence learning". In EMNLP, 2006, pp. 120-128.
Srivastava, N. and Salakhutdinov, R. "Multimodal learning with deep boltzmann machines". To appear in Journal of Machine Learning Research, 2014, pp. 2949-2980.
Memisevic, Roland. "Learning to relate images". IEEE Transactions on Pattern Analysis and Machine Intelligence, 35 (8):1829-1846, 2013.
Memisevic, Roland and Hinton, Geoffrey E. "Learning to represent spatial transformations with factored higherorder boltzmann machines". Copyright Roland Memisevic, Geoffrey Hinton 2009, Department of Computer Science, University of Toronto, Jul. 27, 2009, pp. 1-15.
U.S. Appl. No. 15/606,889, filed May 26, 2017, Yichuan Tang, et al.
U.S. Appl. No. 15/606,884, filed May 26, 2017, Yichuan Tang, et al.
Widodo Budiharto, "Intelligent Surveillance Robot with Obstacle Avoidance Capabilities Using Neural Network", dated May 6, 2015, Hindawi Publishing Corporation (Year:2015), pp. 1-6.
Pablo Negri, "A Cascade of Boosted Generative and Discriminative Classifiers for Vehicle Detection", dated Jan. 16, 2008, Hindawi Publishing Corporation (Year: 2008), pp. 1-12.
Faheem, "A Survey of Intelligent Car Parking System", vol. 11, Dated Oct. 2013, pp. 1-13.
Jeffrey Dean, "Large Scale Distributed Deep Networks", Google Inc,, Mountain View, CA 2012, pp. 1-11.

\* cited by examiner

ANALYSIS OF OBJECTS OF INTEREST IN SENSOR DATA USING DEEP NEURAL NETWORKS

This application claims priority to U.S. Provisional Patent Application Ser. No. 62/343,071, filed May 30, 2016, entitled COMPUTING SYSTEM FOR AUTONOMOUS VIDEO ANALYSIS OF OBJECTS-OF-INTEREST USING DYNAMIC PAN-TILT-ZOOM CAMERAS AND RELATED METHODS; U.S. Provisional Patent Application Ser. No. 62/343,077, filed May 30, 2016, entitled COMPUTING SYSTEM FOR TEMPORAL PREDICTION OF POLYGONS IN VIDEO DATA USING A RECURRENT NEURAL NETWORK AND RELATED METHODS; U.S.

Provisional Patent Application Ser. No. 62/343,080, filed May 30, 2016, entitled COMPUTING SYSTEM FOR DETECTING POLYGONS IN VIDEO DATA USING A DEEP NEURAL NETWORK AND RELATED METHODS; and U.S. Provisional Patent Application Ser. No. 62/343,082, filed May 30, 2016, entitled COMPUTING SYSTEM FOR DYNAMIC CONTROL OF CAMERAS USING VIDEO DATA ANALYSIS AND RELATED METHODS. The disclosures of the foregoing Provisional Applications are incorporated herein by reference.

TECHNICAL FIELD

This disclosure relates to computer systems for autonomous analysis of sensor data.

DESCRIPTION OF THE RELATED ART

Sensor data analysis may be required for a variety of applications. For example, given the challenges and continuous threat to security in the modern urban and suburban environments, video based surveillance is vital to obtain evidence and could be used to facilitate real-time on-the-fly responses to emergency events. In 2014, over 245 million video surveillance cameras were installed globally. Sensor data obtained from a variety of sensor types including video and LIDAR (light detection and ranging) sensors may have to be analyzed for making decisions regarding future movements of autonomous vehicles, which are increasingly a focus of research and development.

Depending on the particular application, a variety of types of objects may be of interest—for example, in the video-based security environment, individuals who may be performing potentially harmful activities may be of interest, while in the environment of an autonomous vehicle, other vehicles, pedestrians, road signs and the like may be of interest. Identifying, tracking and predicting future states of objects of interest in a variety of application domains using sensor data remains a challenging technical problem.

SUMMARY OF EMBODIMENTS

According to one embodiment, a system may comprise one or processors and an associated memory. The memory may store a neural network. The neural network may be configured to receive a representation of sensor data comprising image frames, captured by one or more sensors such as cameras. The neural network may detect an object in the image frames and generate a plurality of polygons surrounding or enclosing the object in various image frames. A prediction of a future position of the object may be generated by the neural network based at least in part on the polygons. The one or more processors may provide one or more commands to a control system (such as a motion control system of a vehicle, or a camera control system which can pan, zoom or otherwise change the state of a camera) based at least in part on the predicted future position.

In at least one embodiment, the neural network may generate a heat map of an image frame. The heat map may comprise a plurality of pixels, with individual ones of the pixels indicating a respective value representing a probability or likelihood that at least a portion of a detected object is located at the pixel. The heat map and a post-processed image corresponding to the image frame may be gated to remove one or more areas of the post-processed image that do not contain the object, producing a gated image in various embodiments. The post-processed image may have been obtained by performing one or more transformations on the image frame, such as reducing the number of color channels, cross-correlation operations and the like in various embodiments.

In some embodiments, to generate the polygons, the neural network may generate a centroid and a set of vertices of a convex polygon from the gated image using a recurrent portion of the neural network. In one embodiment, to generate the prediction of the future position of the object, the neural network may be configured to obtain respective centroids and sets of vertices for individual ones of the plurality of polygons, and determine a position of a future polygon in a future image frame, based at least in part on the respective centroids and sets of vertices.

A variety of sensors and associated computing devices and control systems may be employed in different embodiments. For example, in one embodiment the sensors may include a video camera, the control system may comprise a video camera controller, and the commands provided by the processors may instruct the video camera to move or change a zoon setting to focus or maintain attention on the object. In another embodiment, at least some of the sensors (such as LIDAR devices) may be located on or incorporated within a vehicle, the control system may comprise a motion control subsystem of the vehicle, and the commands may comprise motion control directives (such as to accelerate or decelerate the vehicle).

In some embodiments, an object-of-interest database may be accessible at the system comprising the neural network. An object of interest database may also be referred to in some embodiments as a region-of-interest database. Using such a database, an object type (e.g., a vehicle, a pedestrian, a road sign, or the like) of the object detected using the sensor data may be identified in various embodiments. Based at least in part on the object type, an object analysis technique may be selected and used to monitor respective portions of image frames that lie within respective polygons. The results of the monitoring may be used to detect a state change of the object, and the commands provided by the processors may be based at least partly on the state change.

The neural network may generate predictions of respective future movements of a plurality of objects detected in the image frames in some embodiments. A movement plan for a vehicle, whose execution would result in moving the vehicle from a first position to a second position relative to the plurality of objects, may be determined using the predictions of future movements. Commands provided by the processors to the control systems may be based at least in part on the movement plan.

According to one embodiment, a method may comprise receiving sensor data comprising one or more image frames from one or more sensors. The method may include using a neural network to detect an object in the image frames and generating a plurality of polygons surrounding the object in individual ones of the image frames. A future position of the object may be predicted using the polygons, and one or more commands may be provided to a control system based on the predicted future position.

In one embodiment, a non-transitory computer-accessible storage medium may store program instructions that when executed on one or more processors cause the one or more processors to receive sensor data captured by one or more sensors. The instructions when executed may cause the one or more processors to utilize a neural network to detect an object in the sensor data, generate a plurality of polygons surrounding the object in one or more subsets of the sensor data, and generate a prediction of a future position of the object based at least in part on the plurality of polygons. The instructions when executed may further cause the one or more processors to provide one or more commands to a control system based at least in part on the prediction of the future position of the object.

Figure 1A:
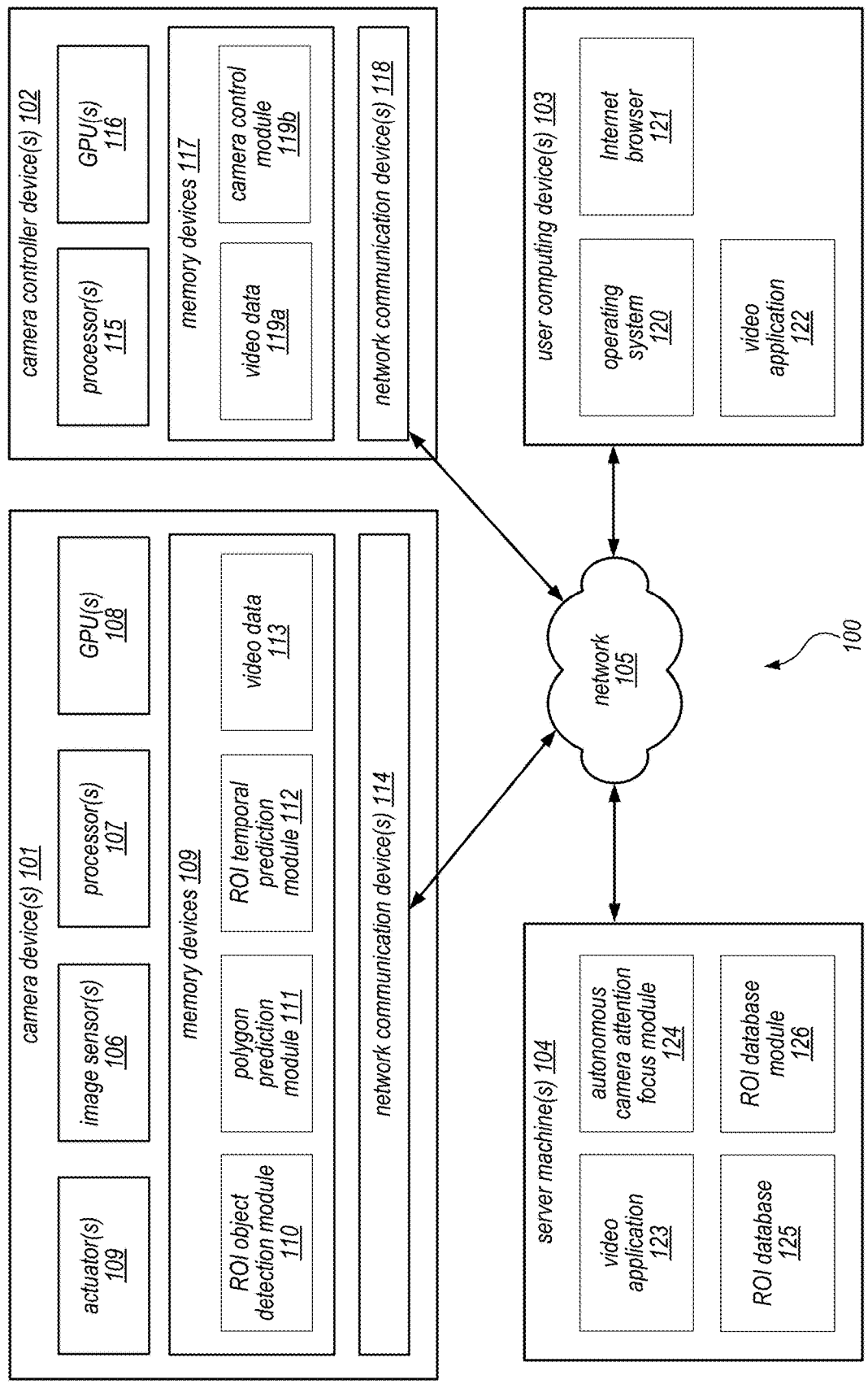
FIG. 1A illustrates an example computing system in which objects of interest in sensor data may be analyzed using deep neural networks, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

It will be appreciated that for simplicity and clarity of illustration, in some cases, reference numerals may be repeated among the figures to indicate corresponding or analogous elements. In addition, some details or features are set forth to provide a thorough understanding of the embodiments described herein. However, it will be understood by those of ordinary skill in the art that the embodiments described herein are illustrative examples that may be practiced without these details or features. In other instances, well-known methods, procedures and components have not been described in detail so as not to obscure the concepts illustrated in the examples described herein. Also, the description is not to be considered as limiting the scope of the example embodiments described herein or illustrated in the drawings. The headings used herein are for organizational purposes only and are not meant to be used to limit the scope of the description or the claims. It is noted that the terms "neural network based model", "neural network model" and "neural network" may be used synonymously with respect to various embodiments to refer to a machine learning model that includes or utilizes at least one network of artificial neurons. The term "deep neural network" (DNN) may be used in various embodiments to refer to a neural network which comprises a plurality of layers of artificial neurons.

In some embodiments, the techniques describe herein generally with respect to sensor data may be applied at least in part to video data, which may for example be captured from surveillance cameras, autonomous vehicles, and the like. In applications using recorded video from surveillance cameras for evidence collection or post-analysis, several aspects of the analysis may be considered important. Firstly, to the extent possible, the camera should readily capture important and relevant data when an abnormal event is triggered, irrespective of the time of the day the event takes place. Secondly, to the extent possible, the resolution and quality of the captured data must be sufficiently high in order to be of use to investigators after the fact. Due to storage and other hardware costs, many security cameras may not be high-definition, but rather may capture video in low resolution, which may lose fine details. This may for example lead to a problematic situation where a suspect/perpetrator's face is blurred or the details of an object of interest (e.g. a license plate) is too grainy to be usable for later investigations. Accordingly, in at least some embodiments, an intelligent system for sensor data analysis may utilize deep neural networks to dynamically focus on the objects-of-interest at the appropriate times by controlling a dynamic camera with pan, tilt and optical zoom capabilities. Such an intelligent system may be referred to in some embodiments as an attention-focusing system.

In at least one embodiment, sensor data collected using various types of sensors of an autonomous or semi-autonomous vehicle may be analyzed using deep neural networks to enable decisions regarding the movements of the vehicle to be made. Objects of interest in the operating environment of the vehicle (such as a road on which the vehicle is moving, other vehicles in the vicinity, pedestrians etc.) may be identified and tracked over successive frames of video or other sensor data in various embodiments. Future movements of at least some of the objects may be predicted using the results of the tracking. An on-board computer system of the vehicle may then use such information to make a variety of decisions, include planning the movements of the vehicle, issuing low level motion directives to motion controllers, and so on.

Some vehicles may include a number of video cameras that can be used to monitor the vehicle's surroundings on an ongoing basis in various embodiments. However, at least during some intervals of time, the captured video data may not include anything of interest that requires further analysis. In such a setting, the vehicle may monitor the captured video data to check for objects of interest. If an object of interest is detected, the vehicle's computer system may be alerted to focus on that object to perform a more detailed analysis. For example, in one embodiment the vehicle may detect that a video frame indicates a traffic sign showing a speed limit. The vehicle may track the traffic sign over successive video frames, and apply text recognition to the portions of the video frames to determine the indicated speed limit in at least some embodiments. In such embodiments, the vehicle's computer system may be relieved from constantly performing text recognition on the entirety of every video frame to recognize speed limits.

In various embodiments, one or more neural network based models may be used to obtain unique representations for each object-of-interest (e.g. a person, a person's face, a car, a road sign, or any other object-of-interest). Furthermore in at least some embodiments, a high resolution image or video of the objects may be obtained using automated control mechanisms. Such high-resolution images or videos of the object-of-interest may for example be recorded for future use, forwarded to a more specialized analysis system for further analysis, or provided to a decision-making system that is responsible for controlling other systems, such as the motion control subsystem for an autonomous vehicle.

In some embodiments, a system for sensor data analysis may be organized as a collection of modules, at least some of which may be designed, developed and/or debugged relatively independently. For example, in one embodiment such a system may comprise at least five modules designated as Modules I-Module V, each implemented using some combination of hardware and software. Modules I and II may each comprise a Multilayer Cross-Correlation Deep Neural Network (MCC-DNN) in some embodiments. Module III may be responsible for computing the velocity, and predicting the locations of, each of one or more polygon ROIs (regions of interest) at one or more future points in time. Module IV may be responsible for encoding and storage of the identity of each polygon of interest into a database called an object-of-interest identity database. Module V may comprise an attentional planner which aggregates the temporal predictions of Module III with the semantic feature information from Module IV to compute an optimal set of motor actions for one or more controlled devices. For example, in one embodiment, motor actions of a camera may be controlled such that high-resolution images would be obtained for as many polygon ROIs as possible. In some embodiments, Module V may generate one or more directives to control the operations of cameras located on a vehicle, and/or the movements of the vehicle itself. A brief summary of some example aspects of the modules are described below with respect to at least some embodiments.

Module I: Region of Interest (ROI) Object Detection Module. This module may, for example, take an image frame (e.g. from video data) as its input and perform a parallel Region of Interest (ROI) detection (e.g. to detect persons' faces, license plates, bags, an object being held, etc.) based on a Multi-layer Cross-Correlation Deep Neural Network (MCC-DNN) in some embodiments. The output of this module may comprise a heat map in various embodiments, such as a (w×h) sized binary image with each pixel taking on values between 0.0 and 1.0, representing the probability or likelihood of at least a portion of an object of interest being present at the location corresponding to the pixel.

Module II: Polygon Prediction via Gated Feedback. This module may, for example, combine the output of Module I, e.g. the heat map, with an input frame by gating the activations of the lower level feature maps, leading to polygon detection. Instead of, for example, detecting rectangular bounding boxes, the module may detects polygons with more than four sided for a more accurate description of the shape of the object of interest compared to a rectangular box in at least some embodiments. Modules I and II combined may comprise a Multilayer Cross-Correlation Deep Neural Network (MCC-DNN) in some embodiments.

Module III: Polygon ROI temporal prediction. This module may, for example, be responsible for predicting the future position and scale of various detected polygons, based for example on the previous motion and dynamics of the polygons. In one example implementation, a recurrent neural network (RNN) with a temporal frequency of 2 Hz may be used for prediction, meaning that successive time steps would be separated by 500 milliseconds. Other frequencies may be used in other implementations. In some embodiments the input to module III (which may comprise a recurrent neural network (RNN)) may include the polygon vertices at each time step, with respect to a global image resolution. The RNN may include multiple hidden layers with LSTM (Long-Short Term Memory) units in at least one embodiment, with connections from one hidden layer to the next in time. The output of the RNN at various time steps may, for example, comprise of the position (expressed using x, y, coordinates) of a given polygon and the size or area at each of the time steps. Given a starting condition in the form of a detected polygon ROI, this temporal RNN may be used to forward propagate N polygon ROIs in the scene in various embodiments.

Module IV: Object-of-Interest Identity Database. In some embodiments, in order to zoom into high-resolution data capture mode for a unique object-of-interest once, for example when the object-of-interest first appears within the camera's viewing area, a sensor data analysis system may assign a unique identifier to each region-of-interest. For example, a feature vector representing a face may represent a unique identifier, or a feature vector representing a vehicle may be considered a unique identifier. To convert a polygon ROI into a unique feature vector, in some embodiments a rectangle which encloses the polygon may be determined. This rectangle may, for example, be used to crop the image to be fed into a separate MCC-DNN with input size of, for example, 128×128. Such an MCC-DNN may be trained in an unsupervised manner to reproduce its input, e.g., using an encoding-decoding neural network architecture. Such an MCC-DNN may generate respective feature vectors that represent each unique object-of-interest in at least some embodiments.

Module V: Autonomous High Resolution Attention Focus. In some embodiments, based at least in part on a database of objects/person of interest, this module may optimize a dynamic temporal scheduler to focus its attention on particular objects, e.g., using pan, tilt and optical zoom controllers. Module V may comprise an attention planner and an attention controller in various embodiments. It is noted that the terms "attention planner" and "attentional planner" may be used synonymously herein, and the terms "attention controller" and "attentional controller" may also be used synonymously. In some embodiments, the attention planner may issue control directives to various controllers on a vehicle, including for example a video camera controller for the vehicle's cameras. The attention planner may analyze the detected objects-of-interest and make predictions regarding their movement relative to the vehicle in some embodiments and, based on this information, the generate control commands to, for example, change the orientation and zoom level of a vehicle camera to focus on the objects.

In some embodiments, as mentioned above, the neural network based sensor data analysis system comprising some combination of modules I-V may be implemented as part of an autonomous vehicle. The autonomous vehicle may have one or more cameras that capture images of the surrounding environment as the vehicle moves. In such embodiments, the attention planner and attention controller may be implemented on an onboard computer of the vehicle, and may comprise a motion selection module that sends motion directives to a motion control subsystem of the vehicle at various intervals. For example, motion directives may include instructions to turn, accelerate, decelerate, break, etc. Based on the detected objects, the polygons, and their predictions motions relative to the vehicle (which may be moving), the vehicle's computer may make various types of movement decisions.

FIG. 1A illustrates an example computing system in which objects of interest in sensor data may be analyzed using deep neural networks, according to some embodiments. As shown, system 100 may include one or more camera devices 101, one or more camera controller devices 102, one or more user computing devices 103, and one or more server machines 104 in the depicted embodiment. These devices or computing systems may be able to communicate with each other over a data network 105. The data network may include different types of data connections, for example, including both wired and wireless connections.

An example embodiment of a camera device 101 may include one or image sensors (e.g. charge-coupled device (CCD) sensors, complementary metal-oxide semiconductor (CMOS) sensors, etc.) 106, one or more processors 107, and one or graphics processing units (GPUs) 108. The camera device may also include electromechanical actuators 109 to control the camera's pan, tilt and zoom in some embodiments. In another example embodiment, the pan, tilt and zoom control may be implemented at least in part via software. The camera device 101 may also include one or more memory devices 109 and one or more network communication devices 114 to communicate with the network 105 in some embodiments. The memory device 109 stores, for example, a ROI object detection module 110 (also called Module I), a polygon prediction module 111 (also called Module II), a polygon ROI temporal prediction module 112 (also called Module III), and video data 113 collected by the subject camera in the depicted embodiment.

In some embodiments a camera, including the image sensor or sensors and the actuators, may exist as a separate device and another computing device in data communication with the camera may include the one or more processors, the one or more GPUs, the one more memory devices and the one or more network communication devices. In some embodiments, hundreds, or thousands, or millions of camera devices may be in data communication with one or more server machines 104 via the network 105. In various embodiments, camera devices 101 may be stationary or moving (e.g. mounted on a vehicle, mounted on a moving platform, etc.). It will be appreciated that any of a variety of camera types may be used in different embodiments, including, for example, webcams, Internet Protocol security cameras, etc.

A camera controller device 102 may include one or more processors 115, one or more GPUs 116, one or more memory devices 117, and one or more network communication devices 118 in the depicted embodiment. In some embodiments, the memory devices 117 may store video data 119a, which may be captured by a camera device 101 and transmitted through the network 105. In some embodiments, the memory devices 117 may store executable modules, such as the camera control module 119b, to control various operational aspects of the camera device 101. In some embodiments, some or all of the modules 110-112 stored on the camera device 101 may be stored in the camera controller device 102. The camera controller device may be configured to control one or more of the cameras, such as by adjusting the pan, tilt, zoom, or combinations thereof.

The user computing device 103 may include one or more processors, one or more GPUs, one or more network communication devices, a display screen, one or more user input devices, and a memory device in the depicted embodiment. The memory device may include various software and/or data, such as an operating system 120, an Internet browser 121 to access a portal provided by the server machine 104, or a video application 122 to view and interact with the data provided by the server machine 104. In various embodiments, the user computing device may comprise, for example, a tablet, a laptop, a desktop computer, a mobile device, a smart phone, a wearable computer, a computer built into a vehicle, etc.

The server machine 104 may comprise one or more physical and/or virtual machines connected to the network 105 in the depicted embodiment. In some embodiments, the server machines 104 may be cloud servers. In some embodiments, one or more server machines 104 may also be configured as a camera controller device 102, and include software such as the camera control module 119b. In some embodiments, a server machine 104 may include some or all of the modules stored on the camera device 101, such as for example modules 110 to 112. In some embodiments, the server machine or machines 104 may be referred to as the "server system".

The server system 104 may include one or more processors, one or more GPUs, one or more network communication devices, and one or more memory devices. The memory may store, for example, a video application 123, which may include one or more programmatic interfaces such as a graphic user interface (GUI), command line tools, application programming interfaces (APIs) and the like which may be invoked from user computing devices 103. The memory of the server system 104 may include an autonomous camera attention focus module 124 (e.g. Module V of the modules indicated above), an ROI database module 126 and the ROI database 125 (which in combination may comprise Module IV) in the depicted embodiment. In some embodiments, ROI databases and associated modules may also be referred to as object-of-interest databases and associated modules.

In some embodiments, Modules I, II and III (e.g., 110, 111, and 112) may reside and operate locally on the camera device 101, e.g., in order to reduce bandwidth requirements associated with sending video data to the server system 104 or any other computing device. By executing at least some of the sensor data analysis computations locally on the camera devices in such embodiments, the overall speed of the analysis may be increased, as transit times involved in network transfers may be avoided. In other embodiments the computations of Modules I, II and III may be executed by or at the server system 104, or by other computing devices.

In one embodiment, a camera-equipped device 101 may include the camera itself, a chip to convert the image signal (e.g. CCD signal or CMOS signal) to a frame buffer, followed by a bus connecting it to a microprocessor. The microprocessor may for example include one or more of Digital Signal Processors (DSPs), Field Programmable Gate Arrays (FPGAs), Systems on Chip or mobile GPUs cards.

In some embodiments, objects of interest identified in sensor data may be analyzed using deep neural networks in system such as autonomous or partially autonomous vehicles. The term "autonomous vehicle" may be used broadly herein to refer to vehicles for which at least some motion-related decisions (e.g., whether to accelerate, slow down, change lanes, etc.) may be made, at least at some points in time, without direct input from the vehicle's occupants. In various embodiments, it may be possible for an occupant to override the decisions made by the vehicle's decision making components, or even disable the vehicle's decision making components at least temporarily. Furthermore, in some embodiments, a decision-making component of the vehicle may request or require an occupant to participate in making some decisions under certain conditions. The vehicle may include one or more sensors, one or more sensor controllers, and a vehicle computer. The vehicle may also include a motion control subsystem, which controls a plurality of wheels of the vehicle in contact with a road surface.

In some embodiments, the motion control subsystem may include components such as the braking system, acceleration system, turn controllers and the like. The components may collectively be responsible for causing various types of movement changes (or maintaining the current trajectory) of vehicle, e.g., in response to directives or commands issued by decision making components. In some embodiments, the decision components may include a motion selector responsible for issuing relatively fine-grained motion control directives to various motion control subsystems, as well as a planner responsible for making motion plans applicable for longer time periods such as several seconds. The rate at which directives are issued to the motion control subsystem may vary in different embodiments. Under some driving conditions (e.g., when a cruise control feature of the vehicle is in use on a straight highway with minimal traffic) directives to change the trajectory may not have to be provided to the motion control subsystems at some points in time. For example, if a decision to maintain the current velocity of the vehicle is reached by the decision-making components, and no new directives are needed to maintain the current velocity, the motion selector may not issue new directives even though it may be capable of providing such directives at that rate.

The decision making components may determine the content of the directives to be provided to the motion control subsystem based on several inputs processed by the vehicle computer in different embodiments. In some embodiments, the vehicle computer may implement a sensor data analyzer which includes instances of some or all of the components 110-113, 125, and/or 126. The sensor data analyzer may implement one or more neural networks configured to process sensor data collected from the environment as the vehicle moves. The sensor data analyzer may, for example, receive images representing the operating environment (such as a road) from the sensors at a regular frequency. In some embodiments, each image may be analyzed to extract a plurality of features. Feature indicators may be provided to the decision making components, which may use the feature indicators to issue control directives to the motion control subsystem.

Inputs may be collected at various sampling frequencies from individual video cameras and/or other sensors by the sensor data analyzer in different embodiments. At least some frames of the video may be processed at the neural network(s) of the sensor data analyzer in the depicted embodiment. In some embodiments, the sensor data analyzer may analyze the video frames or other sensor data at a slowly frequency than the rate at which the data are being generated. Different cameras and other sensors may be able to update their output at different maximum rates in some embodiments, and as a result the rate at which the output is obtained at the decision making components may also vary from one sensor to another.

A wide variety of sensors may be employed in the depicted embodiment, including for example video or still cameras, radar devices, LI DAR (light detection and ranging) devices and the like. In addition to conventional video and/or still cameras, in some embodiment near-infrared cameras and/or depth cameras may be used. In some embodiments, the sensors may comprise one or more camera devices 101. Different types of sensors may be used in different contexts. For example, while certain image sensors may capture good quality sensor data during high-light scenarios, they may provide very little useful sensor data in low-light scenarios, as the image data may not be able to distinguish objects within the environment. However, other sensors, such as a LiDAR sensor may have good low light capabilities. Because different sensors may capture redundant information (e.g., like the image sensor and LiDAR example above), fusion techniques may sometimes be implemented to leverage the strengths of different sensors in different scenarios. Several of these devices may be used to repeatedly generate successive frames in a continuous "video" of the road scene or other aspects of the vehicle environment over a period of time. For example, a LIDAR device may be used to produce a LIDAR video, and an infrared camera may be used to produce an infrared video, and so on. In some embodiments, additional sensors may be used to generate videos and/or add information to the captured scene, which may be included in various video frames captured by vehicle cameras. Such additional sensors may include radars, ultrasonic sensors, light beam scanning devices, infrared devices, location sensors (e.g., global positioning satellite (GPS) or Differential GPS (DGPS)), or inertial measurement sensors (e.g., accelerometers, speedometers, odometers, and angular rate sensors, like gyroscopes) in different embodiments. Various ones of these sensors may capture and provide raw sensor data to respective sensor data processing pipelines implemented by the vehicle computer to may make perception decisions, such as detecting, classifying, or tracking objects as discussed in further detail below.

In various embodiments, the vehicle computer 135 may include a number of modules and/or data that may be used to implement a sensor data analysis system on the vehicle. The modules may include for example the ROI object detection module 110, the polygon prediction module 111, the ROI temporal prediction module 112, the ROI database 125, and the ROI database module 125. In some embodiments, the ROI database 125 may shadow a master ROI database maintained on a remote server, and receive periodic updates from the master ROI database. In some embodiments, the vehicle computer may store some amount of video data 113, which may comprise raw or processed video images captured by the sensors.

In some embodiments, the vehicle computer may communicate with a sensor controller to control the operation of the sensors. For example, in some embodiments, the vehicle computer or the sensor controller may implement a camera control module 119b. The camera control module may operate to control various aspects of the vehicle's sensors, such as for example the pan-tilt-zoom operations of the cameras. In some embodiments, the sensors may include actuators such as actuators 109.

It is noted that although, by way of example, various operations related to sensor processing are described in the context of image frames or video frames, the techniques and algorithms described herein may be applied with equal success to groups of sensor data that may not necessarily include images as such. An image frame may thus be considered just one example of a group or collection of sensor data corresponding to a particular time of data capture. Other examples of such groups may comprise, for example, infrared data, LI DAR data, temperature data and the like. In at least some embodiments various sets of image data may be analyzed in combination with non-image data—e.g., images captured in low light conditions may be enhanced using infra-red data and the like.

Figure 1B:
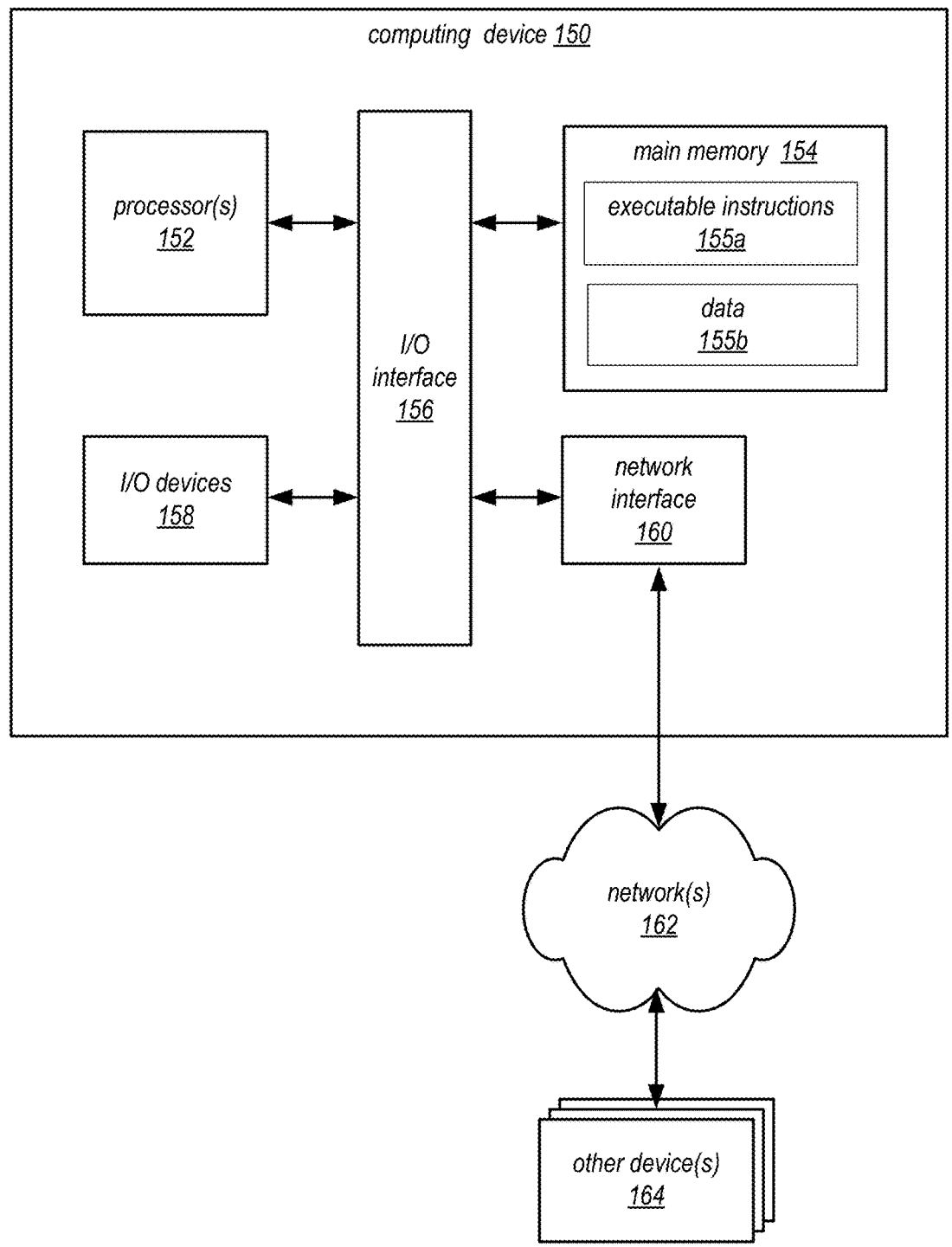
FIG. 1B illustrates an example computer system that may be used to implement one or more elements of a sensor data analysis system.

FIG. 1B illustrates an example computer system that may be used to implement one or more elements of a sensor data analysis system, according to some embodiments. In at least some embodiments, a system and/or server that implements a portion or all of one or more of the methods and/or techniques described herein, including the techniques to processed video images, to execute machine learning algorithms including neural network algorithms, to access remote databases, to control the operations of the cameras, and the like, may be executed on a general-purpose computer system that includes or is configured to access one or more computer-accessible media. FIG. 1B illustrates such a general-purpose computing device 150. In the illustrated embodiment, computing device 150 includes one or more processors 152 coupled to a main memory 154 (which may comprise both non-volatile and volatile memory modules, and may also be referred to as system memory) via an input/output (I/O) interface 156. Computing device 150 further includes a network interface 160 coupled to I/O interface 156, as well as additional I/O devices 158 which may include sensors of various types.

In various embodiments, computing device 150 may be a uniprocessor system including one processor 152, or a multiprocessor system including several processors 152 (e.g., two, four, eight, or another suitable number). Processors 152 may be any suitable processors capable of executing instructions. For example, in various embodiments, processors 152 may be general-purpose or embedded processors implementing any of a variety of instruction set architectures (ISAs), such as the x86, PowerPC, SPARC, or MIPS ISAs, or any other suitable ISA. In multiprocessor systems, each of processors 152 may commonly, but not necessarily, implement the same ISA. In some implementations, graphics processing units (GPUs) may be used instead of, or in addition to, conventional processors.

Memory 154 may be configured to store instructions and data accessible by processor(s) 152. In at least some embodiments, the memory 154 may comprise both volatile and non-volatile portions; in other embodiments, only volatile memory may be used. In various embodiments, the volatile portion of system memory 154 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, executable program instructions 155a and data 155b implementing one or more desired functions, such as those methods, techniques, and data described above, are shown stored within main memory 154.

In one embodiment, I/O interface 156 may be configured to coordinate I/O traffic between processor 152, main memory 154, and various peripheral devices, including network interface 160 or other peripheral interfaces such as various types of persistent and/or volatile storage devices, sensor devices, etc. In some embodiments, I/O interface 156 may perform any necessary protocol, timing or other data transformations to convert data signals from one component (e.g., main memory 154) into a format suitable for use by another component (e.g., processor 152). In some embodiments, I/O interface 156 may include support for devices attached through various types of peripheral buses, such as a variant of the Peripheral Component Interconnect (PCI) bus standard or the Universal Serial Bus (USB) standard, for example. In some embodiments, the function of I/O interface 156 may be split into two or more separate components. Also, in some embodiments some or all of the functionality of I/O interface 156, such as an interface to memory 154, may be incorporated directly into processor 152.

Network interface 160 may be configured to allow data to be exchanged between computing device 150 and other devices 164 attached to a network or networks 162, such as other computer systems or devices as illustrated in the figures. In various embodiments, network interface 160 may support communication via any suitable wired or wireless general data networks, such as types of Ethernet network, for example. Additionally, network interface 160 may support communication via telecommunications/telephony networks such as analog voice networks or digital fiber communications networks, via storage area networks such as Fibre Channel SANs, or via any other suitable type of network and/or protocol.

In some embodiments, main memory 154 may be one embodiment of a computer-accessible medium configured to store program instructions and data as described herein for implementing embodiments of the corresponding methods and apparatus. However, in other embodiments, program instructions and/or data may be received, sent or stored upon different types of computer-accessible media. Various embodiments may further include receiving, sending or storing instructions and/or data implemented in accordance with the foregoing description upon a computer-accessible medium. Generally speaking, a computer-accessible medium may include non-transitory storage media or memory media such as magnetic or optical media, e.g., disk or DVD/CD coupled to computing device 150 via I/O interface 156. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 150 as main memory 154 or another type of memory. Further, a computer-accessible medium may include transmission media or signals such as electrical, electromagnetic, or digital signals, conveyed via a communication medium such as a network and/or a wireless link, such as may be implemented via network interface 160. Portions or all of multiple computing devices such as that illustrated in the figure may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Figure 1C:
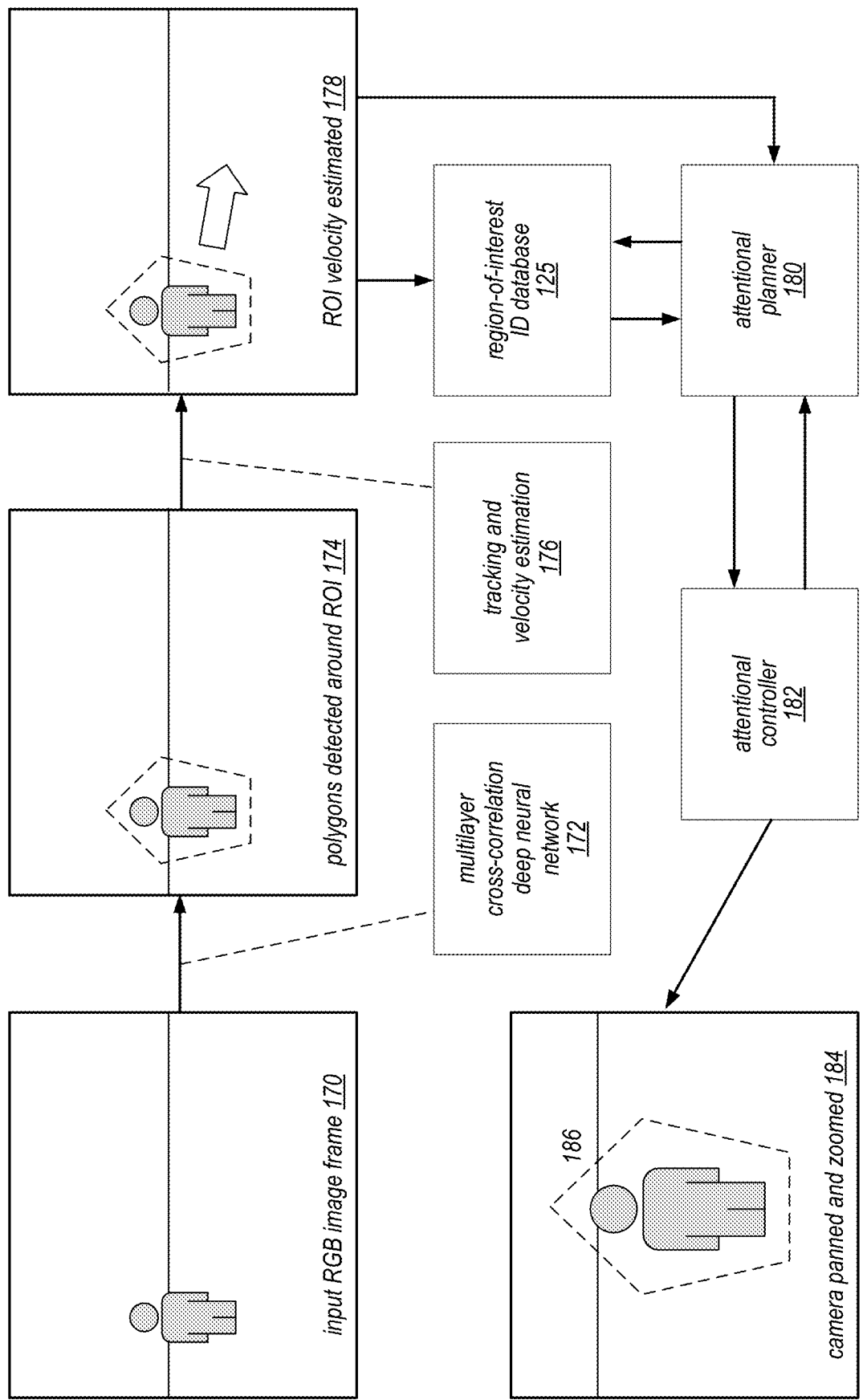
FIG. 1C illustrates an example high level workflow of the processing of video data during analysis, according to some embodiments.

FIG. 1C illustrates an example high level workflow of the processing of video data during analysis, according to some embodiments. As shown, input comprising RGB (red-green-blue) image frames 170 may be fed into a Multilayer Cross-Correlation Deep Neural Network (MCC-DNN) 172. The output of the MCC-DNN may be a set of one or more polygons with a variable numbers of vertices, as shown in element 174. Each polygon may enclose a region-of-interest (ROI) for further analysis in some embodiments. Velocities of the polygons may then be estimated (element 176), e.g., using computations on the polygon ROIs from the previous frame in time, as shown in element 178. This outputs an estimated velocity or other movement dynamic (e.g. position, acceleration, jerk, etc.) of each ROI. To uniquely identify objects within a scene in a given time period, unique object-level identity features may be extracted and stored into a ROI ID database 125 in the depicted embodiment. The estimated velocity of the trajectory of an object may be fed into an attentional planner module 180 to plan for the optimal trajectory and zoom level to focus attention on the ROI in various embodiments. For example, in some embodiments, a plan generated by the attentional planner module 180 may be used to control the movement of a pan-tilt-zoom camera, such that it zooms into as many ROIs as possible given the physical camera system constraints. The constraints may include, for example, the current state of the camera, which may be transmitted by the attentional controller 182 or from the camera itself. Other camera constraints in various embodiments may include, for example, the rate of movement (e.g. how many degrees per second the camera can pan or tilt, or both), the rate of zoom, the boundaries of movement (e.g. upper and lower bounds of pan or tilt, or both), and/or the boundaries or limits of zoom.

In some embodiments, the attentional controller 182 may communicate with the attentional planner 180 to control the movement of a physical camera. In one embodiment, the attentional controller 182 may comprise one or more camera control devices 102, as discussed in connection with FIG. 1A. In some embodiments, the attentional controller may comprise a sensor controller. For example, an attentional controller 182 may cause the camera, based on a planned trajectory, to switch focus from a first object at a first point in time to a second object at a subsequent point in time. An example of such processing is shown in element 184, which shows a video frame that has been processed to focus on an object of interest 186 using camera panning and zooming.

Operations corresponding to element 172 of FIG. 1C may, for example, be executed by instances or implementations of Modules I and II of the system described earlier in some embodiments. Operations corresponding to element 176 may, for example, be executed by an instance of Module III. The operations of processing and loading data into the ROI database 125 may be executed, for example, by instances of Module IV. The operations of blocks 180, 182 may be executed, for example, by instances of Module V. Further details regarding each of the modules are provided below with respect to at least some embodiments.

Module I: Region of Interest (ROI) Detection

In some embodiments, Module I for detecting regions of interest, e.g. regions with abnormal activities, or regions with objects of interest, may be a specific instance of a general class of deep neural networks that may be referred to as Multilayer Cross Correlation Deep Neural Network (MCC-DNN). MCC-DNNs may perform two-dimensional (2D) cross correlation operations between a lower layer of the model and a set of features or kernels in various embodiments. This process may be performed recursively in some embodiments, as the output representation of one layer may be used as the input representation of the next-higher layer. In various embodiments, an MCC-DNN may be capable of generating both a probabilistic heat map of regions-of-interest and a set of 2D polygons marking the exact spatial extent of the objects of interest.

Figure 2:
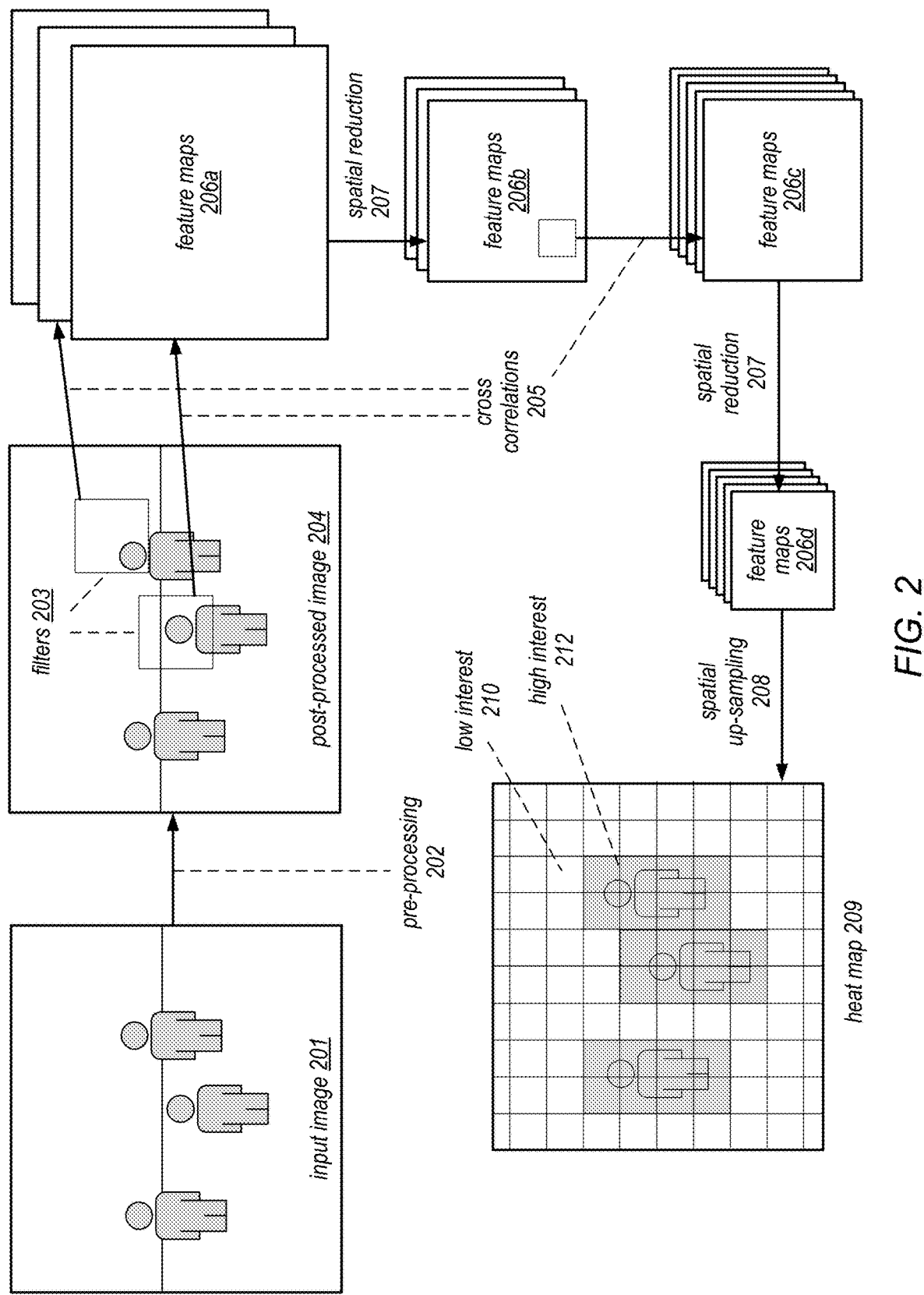
FIG. 2 illustrates an example flow of processing for detecting a region of interest in video data, according to some embodiments.

FIG. 2 illustrates an example flow of processing for detecting a region of interest in video data, according to some embodiments. The processing may be performed using an instance or implementation of Module I in various embodiments. In some embodiments, the input to the module may comprise a raw RGB image, while the output may be a single-channel gray scale image akin to a heat map. Heat map regions with higher values may indicate regions with a higher probability of having an object-of-interest or abnormal activity present in that region in various embodiments As shown in FIG. 2, an input image 201 may be obtained, and various transformation or pre-processing operations 202 may be performed on it to generate a post-processed image 204. Details of the pre-processing are provided below with respect to various embodiments. Filters 203 may be applied to the post processed image 204 in the depicted embodiment, generating feature maps 206a. The remaining portion or portions of the filtered image may be cross-correlated 205 with feature maps 206a or 206c. The cross correlations may be among the computing operations that are part of the MCC-DNN's functions in various embodiments. Interspersed between the cross-correlation operations, the spatial resolution of portions of the feature maps may be reduced, as indicated by arrows 207. Spatial up-sampling may be used in some embodiments to return the spatial resolution to its original level 208. As output of this phase of sensor data processing, a heat map 209 showing regions of high interest 210 or regions of low interest 212 (or both high and interest and low interest regions) may be provided in various embodiments. Further details regarding sub-processes of Module I are provided below with respect to various embodiments.

Module I Pre-Processing

In various embodiments the input to module I may include, for example, decoded RGB images from a frame grabber of a video camera. In some embodiments, each frame may consist of 8-bit per pixel 3 channel RGB image data. Given these color images, the camera device 101, may, for example, reduce the number of color channels from 3 to 2 using a nonlinear preprocessing algorithm which divides the red and green channels by the maximum of all three channels. This may reduce intensity of the representation. The natural logarithm may then be taken after the division in various embodiments as indicated in equations (1) and (2).

First Channel: $\log(R/\max(R,G,B))$ (1)

Second Channel: $\log(G/\max(R,G,B))$ (2)

In various embodiments, this preprocessing may nonlinearly transform the input to the MCC-DNN from 3 to 2 channels, while providing a certain degree of illumination invariance to improve recognition accuracy.

Module I Cross-Correlation Operations

In some embodiments, operations performed in the MCC-DNN may comprise the 2D cross-correlation operations between the feature map of the previous layer and a 2D kernel (or 2D filter) of, for example, dimension 3×3. For clarity of presentation, the 1D cross correlation between f and g may be defined as:

$(f*g)(t) \triangleq \int_{\tau} f(\tau)g(t+\tau)d\tau$ (3)

This is in contrast to the standard 1D convolution operation which essentially requires the flipping of kernel g:

$(f \otimes g)(t) \triangleq \int_{\tau} f(\tau)g(t-\tau)d\tau$ (4)

In at least some embodiments, the kernel may be learned from scratch, and there may be no algorithmic reason to prefer the use of standard convolutions. In various embodiments, 2D cross-correlation operations may comprise the main operands used in the MCC-DNNs described herein. This may reduce the complexity of the model and speed up processing time without negatively effecting model performance in at least some embodiments.

In the example of a 2D cross-correlation between an image I(x, y) and a 3×3 kernel K(x', y'), the operation to compute cross-correlation response J may be defined as follows with respect to at least some embodiments:

$$J(x, y) = \sum_{\tilde{x}=-1}^{\tilde{x}=1} \sum_{\tilde{y}=-1}^{\tilde{y}=1} I(x + \tilde{x}, y + \tilde{y}) \times K(\tilde{x}, \tilde{y})$$ (5)

Module I—Activation Function

For each layer within the MCC-DNN, following the 2D cross-correlation, in some embodiments a nonlinear activation function may be applied independently for all hidden nodes. One activation function that may be used is the Rectified Linear Unit (ReLU) activation, which may be represented as follows:

$f(x)=\max(0,x)$ (6)

This activation function has two key properties. First, it may result in a sparsification (an increase in sparsity) of the activations, which may in turn lead to better generalization. Second, there may be no plateaus in the values of x which would result in the post activation function being flat.

In some embodiments, an MCC-DNN used for sensor data analysis may utilize Annealed Rectified Linear Unit (Annealed ReLU) activation. In Annealed ReLU, instead of using a fixed activation throughout the entire training process, which could result in optimization possibly being stuck in a local minimum, the following time-dependent activation function may be used in at least some embodiments:

$$f_t(x) = \max\left\{\max\left(\frac{T-t}{T}, 0\right)x, x\right\}$$ (7)

In Equation (7), t is the current "time" in the optimization sense (e.g. based on the number of epochs of the training process that have been completed), and T is a hyper-parameter, specifying at what point the activation function becomes the standard rectified function of Equation (6).

Figure 3:
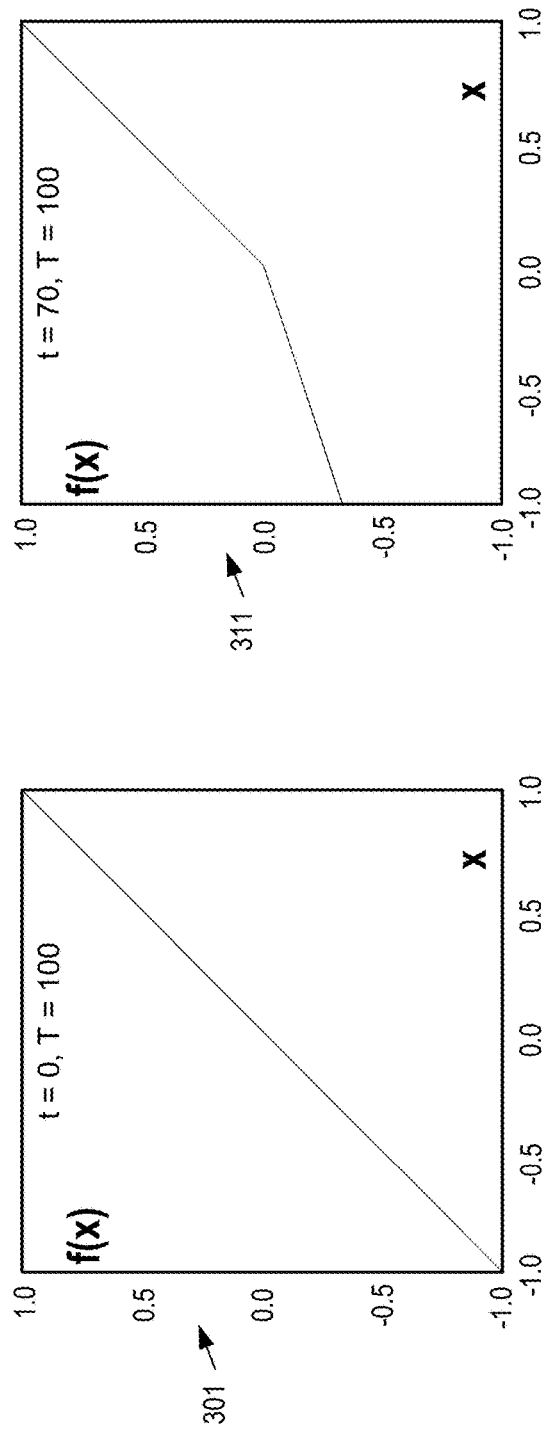
FIG. 3 illustrates aspects of an annealed rectified linear unit which may be utilized for processing sensor data, according to some embodiments.
Figure 3:
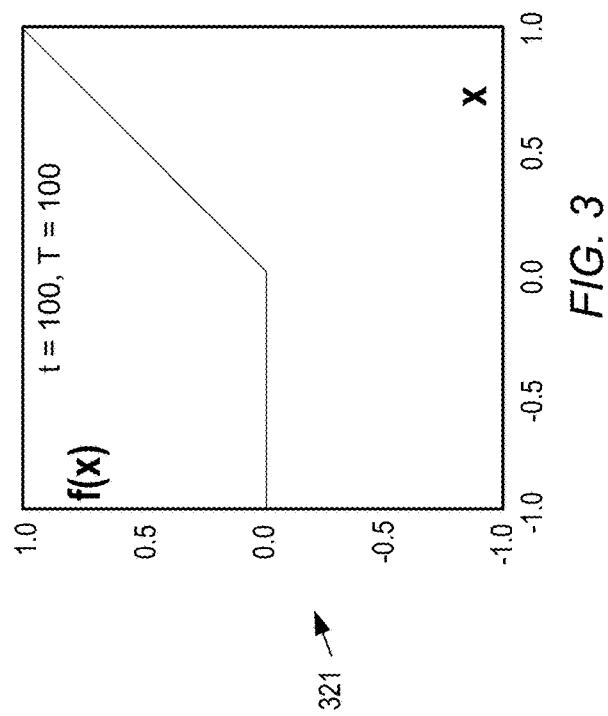

FIG. 3 illustrates aspects of an annealed rectified linear unit which may be utilized for processing sensor data, according to some embodiments. The graphs 301, 311 and 321 depict the behavior of the activation function f(x) for different combinations of t and T as the network is being trained. T may be set to 100 in the depicted embodiment. Initially, at the beginning of training, as seen in the graph 301, the activation function behaves like a linear identity transfer function. A given deep neural network with all linear activation functions is known to be convex, thereby making optimization easier. As training progresses from iteration 1 to iteration T, the activation gradually reaches the final shape of the Rectified Linear Unit (ReLU) function shown in graph 321, with $f_r(x)$ being zero for all x<0, after passing through an intermediate stage indicated in graph 311.

Figure 4:
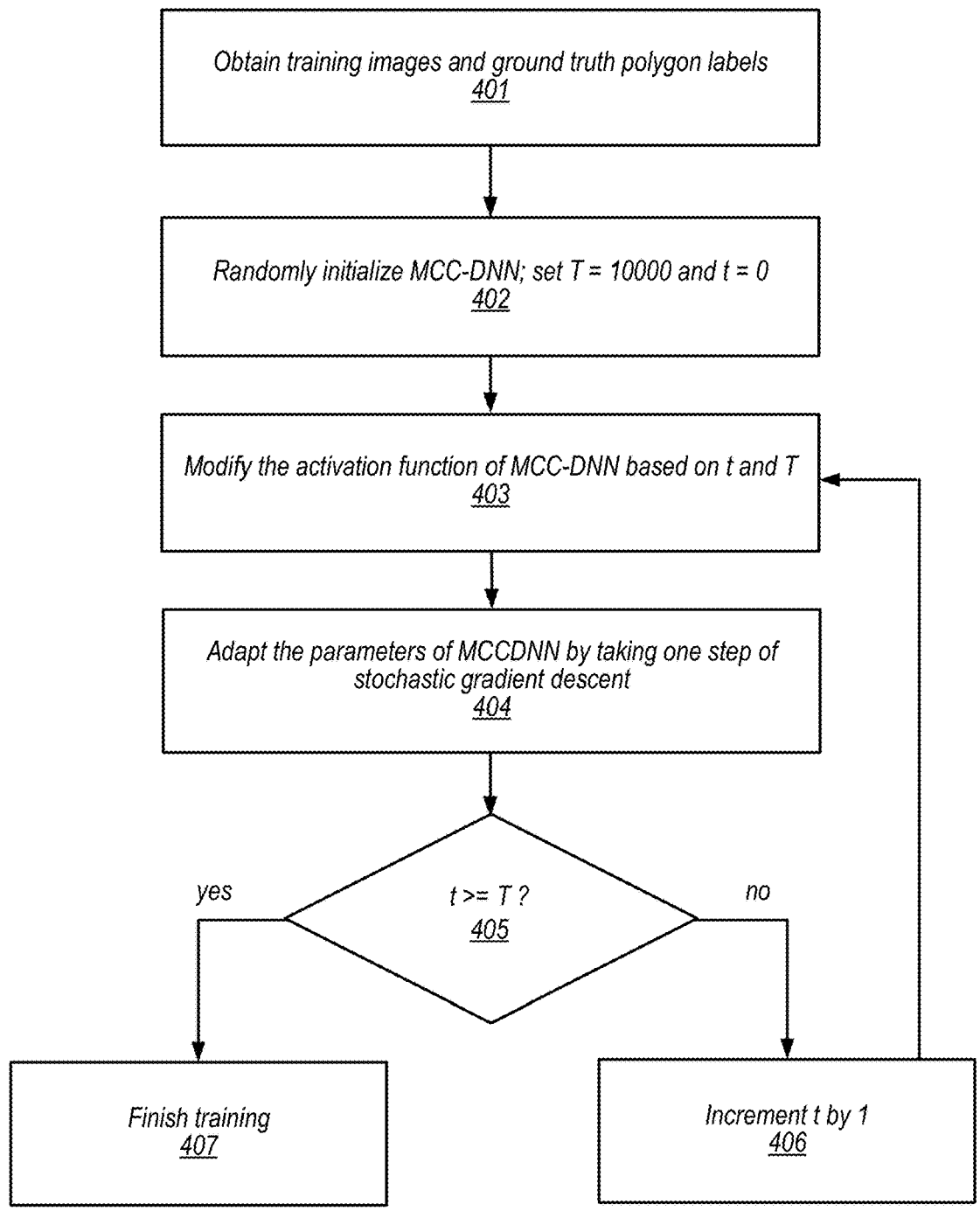
FIG. 4 is a flow diagram illustrating aspects of operations which may be performed to train a deep neural network to detect regions of interest using annealed rectified linear activations, according to some embodiments.

FIG. 4 is a flow diagram illustrating aspects of operations which may be performed to train a deep neural network to detect regions of interest using annealed rectified linear activations, according to some embodiments. As shown in element 401, a training system may obtain training images and ground truth polygon labels. As indicated in element 402, the training system may randomly initialize the MCC-DNN, and may for example set T to 10000 and t to 0 with respect to the Annealed RelU equation (7) above. As training proceeds, the training system may modify the activation functions based on t and T in accordance with equation (7) in the depicted embodiment (element 403) The training system may adapt the parameters of the MCC-DNN by taking one step of stochastic gradient descent, as indicated in element 404. If t is greater than or equal to T as determined in operations corresponding to element 405, the training may be terminated as indicated in element 407. Otherwise, the training system may loop back to element 403 to perform further modification of the activation function for the next epoch. Prior to looping back, the iteration counter t may be incremented by 1 as indicated in element 406. In this fashion, the training system may train an MCC-DNN comprising Annealed Rectified Linear Units in at least some embodiments.

Module I—Spatial Reduction

In some embodiments, after at least some cross-correlation operations between input feature maps and output feature maps, the spatial resolution of the representation may be reduced by a spatial average operation. The spatial average operation may take, for example, the nearby 3×3 neighborhood in a feature map, and reduce it to a single value by taking the average of the 9 values of the neighborhood. This operation may be performed throughout the locations of each of the feature maps in some embodiments. In effect, the spatial reduction operation 207 shown in FIG. 2 may reduce the spatial resolution of the feature maps 206 by subsampling in such embodiments.

Module I—Spatial Up-Sampling

In some embodiments, the MCC-DNN may include computing operations that undo the spatial subsampling, to return the spatial resolution of the hidden layers to the resolution level prior to the sub-sampling. Such operations are indicated by element 208 of FIG. 2. When predicting the Region-Of-Interest, in some embodiments it may be useful to predict regions at a finer scale (e.g. at a pixel level). One way to connect coarse, low-resolution inputs (e.g., a bottleneck layer) to finer resolution regions is via interpolation. For example, in some embodiments, the camera device may use a linear interpolation that computes each output map from the nearest four inputs by a linear map that depends only on the relative positions of the input and output units within the map. This may represent a form of up-sampling or image super resolution in at least some embodiments.

Module I—ROI Heat Map Generation

In some embodiments, a region-of-interest may be represented in the form of a heat map H(x, y) of width w and height h. H(x, y) may consist of values between 0.0 and 1.0 in some implementations, with each value representing the probability of having an object of interest present at the corresponding location. Such a heat map 209 may be produced as the output of Module I in various embodiments as shown in FIG. 2.

Unlike some traditional scanning-window models, the heat map 209 may not be computed serially in at least some embodiments by scanning windows of different sizes, rotation, and scale, which is not easily scalable to large images and real time video processing. Instead, the heat map 209 may be generated in parallel from the MCC-DNN, where the internal representation has already coded for various features useful for representing regions of interest or regions of high likelihood of interest such as human faces, road objects, or other high-value targets. For example, multiple or all the pixels of the heat map 209 may be generated in parallel. Such parallelization may help to rapidly identify the regions that are of interest in various embodiments.

Module II: Polygon Prediction

In some embodiments, the output of Module I may be a predicted heat map $H(x, y) \in [0.0, 1.0]$ as discussed above. The higher the value of a cell in the heat map H(x, y), the more likely it may be that something of interest is present at that location in the image in such embodiments.

Figure 5A:
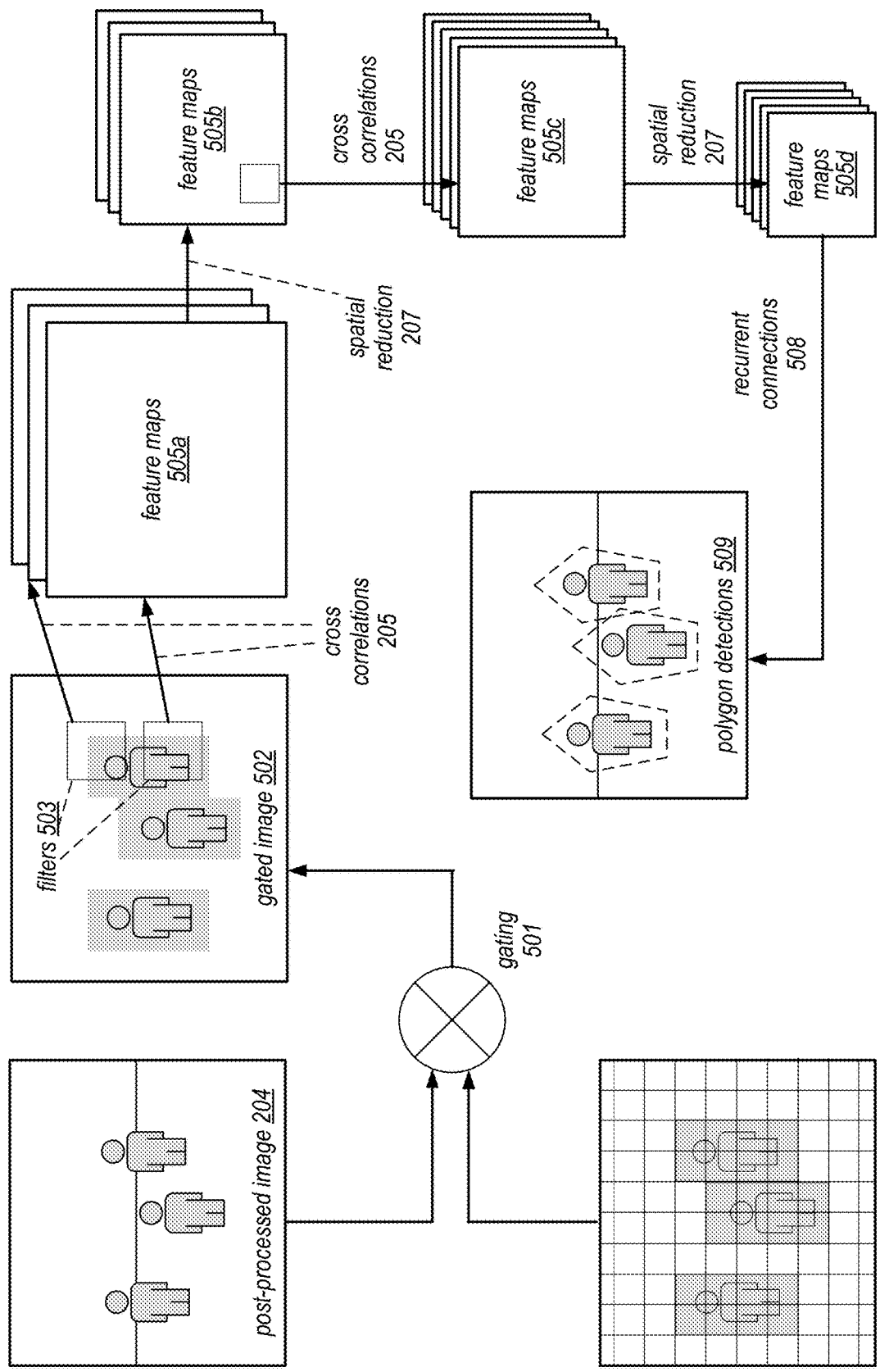
FIG. 5A depicts an example flow of processing for predicting polygons in video data, according to some embodiments.

In various embodiments, a second module, Module II, may use the combination of (a) a predicted heat map 209 and (b) the post-processed image 204 from the Module I as input to generate a finite set of convex polygons which surround objects-of-interest. FIG. 5A depicts an example flow of processing for predicting polygons in video data, according to some embodiments. A gated feedback technique may be employed to remove certain areas of intermediate images from the prediction workflow in the depicted embodiment. As shown, the heat map 209 and the post-processed image 204 may be multiplicatively gated 501 to generate a gated image 502. Filters 503 may be applied to the gated image, and the one or more remaining portions may be cross-correlated 504. The feature maps 505, or portions thereof, may undergo spatial reduction 506. The operations may occur several times when generating the feature maps. Recurrent connections 508 in the neural network may be used to output one side of a predicted polygon at a time in some embodiments. The output 509 may comprise multiple predicted polygons in various embodiments.

Module II—Gating

In some embodiments, a first operation of Module II may comprise the gating 501 of the heat map 209 with the post-processed image 204 to produce a gated image 502. The gating may be a multiplicative gating that is implemented by element-wise multiplication of the heat map H(x, y) and the image I(x, y) at all locations in at least one embodiment. Gating techniques which are not multiplicative may be employed in one embodiment. In some embodiments, gating may remove areas of input images which are not interesting, for example, background or static structures in the scene.

In some embodiments, gated feedback of the kind illustrated in FIG. 5A may help to focus the capabilities of the polygon detection system at only regions of interest, making it computationally efficient. Furthermore, in at least some embodiments, such gated feedback may perform a version of non-maximal suppression or lateral inhibition so that there is a one-to-one match between a predicted convex polygon and an object-of-interest (e.g. a face, a road object, etc.). An MCC-DNN used in Module II may be similar to an MCC-DNN used in Module I in some embodiments. However, the two MCC-DNNs may not necessarily use the same set of parameters in at least some embodiments.

Module II—Recurrent Connections

Figure 5B:
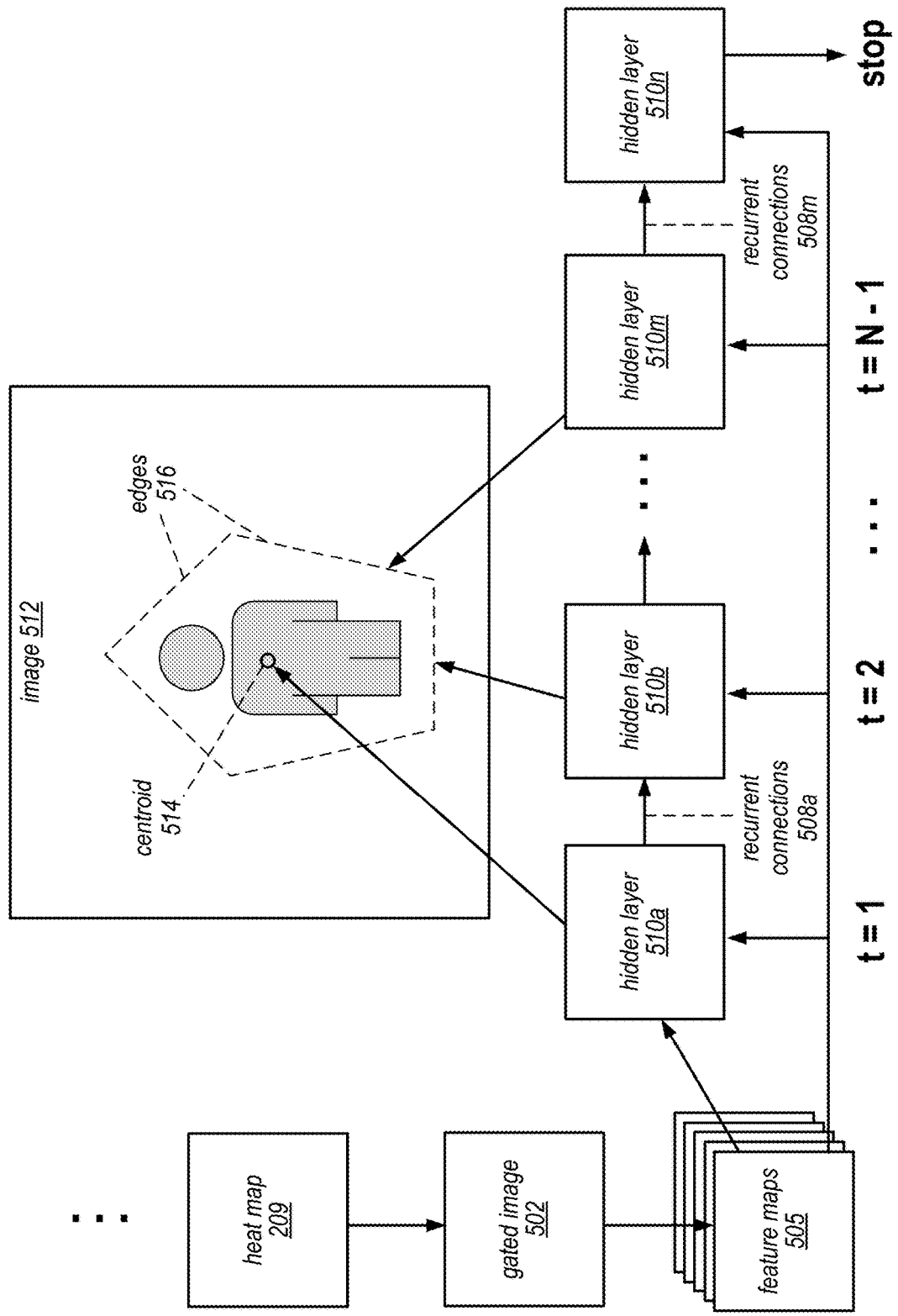
FIG. 5B depicts an example flow of processing for using recurrent neural networks to detect polygons, according to some embodiments.

In some embodiments, the sensor data analysis system may be capable of predicting convex polygons with a varying number of vertices and edges. FIG. 5B depicts an example flow of processing for using recurrent neural networks to detect polygons, according to some embodiments. In some embodiments, a recurrent neural network (which may be termed "PolygonRNN" herein) which takes the output of the gating MCC-DNN features as input may be used. PolygonRNN may be configured to generate a varying but finite number of polygons per object of location. Within each hidden layer 510 (e.g., 510a, 510b, . . . , 510n), PolygonRNN may use one or more Long Short Term Memory (LSTM) units in at least some embodiments.

Recurrent connections 508 (e.g., 508a, 508b etc.) may link various hidden layers in the depicted embodiment.

Figure 6:
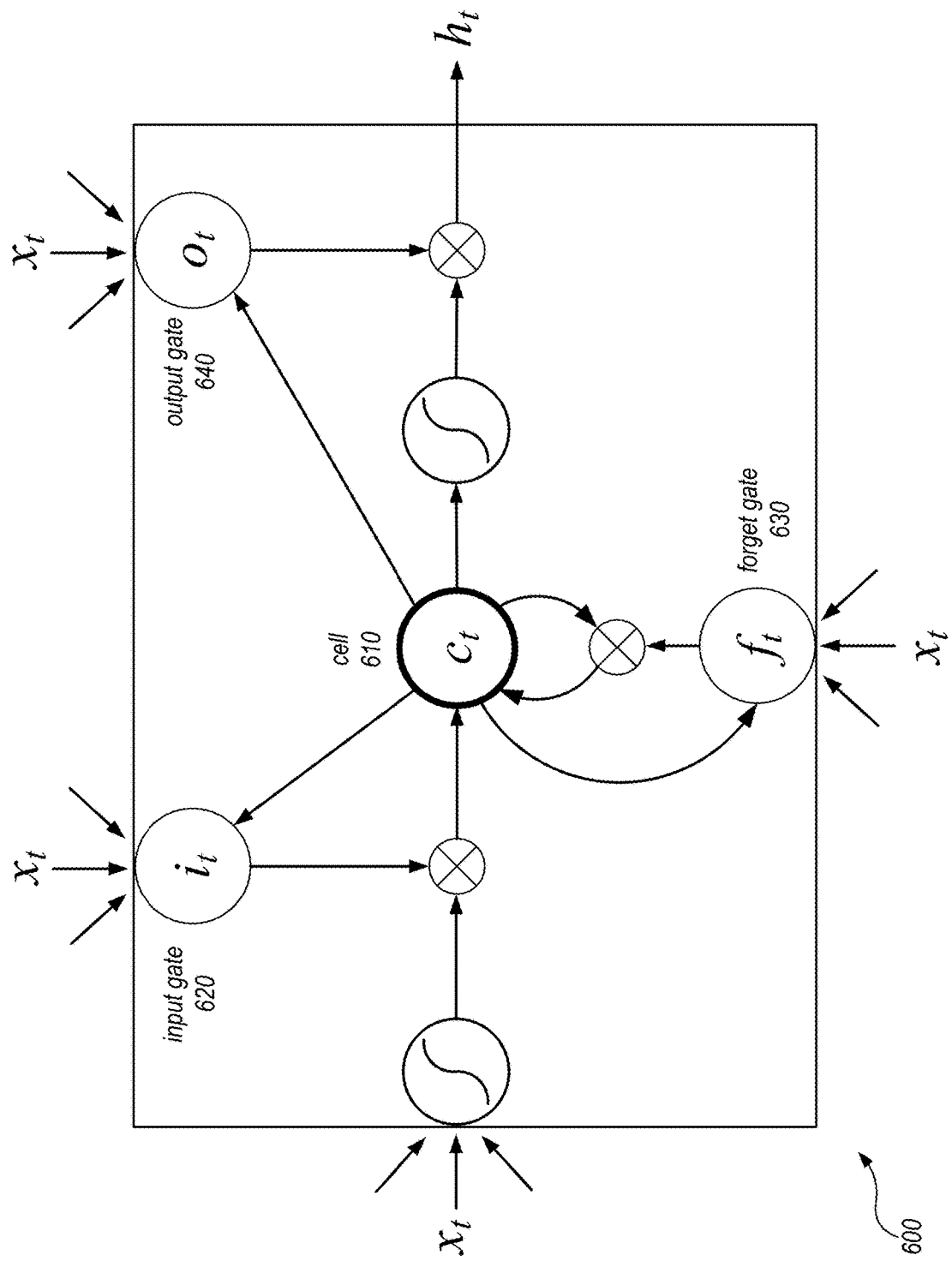
FIG. 6 is a schematic diagram of a Long-Short Term Memory unit that may be used in polygon generation, according to some embodiments.

FIG. 6 is a schematic diagram of a Long-Short Term Memory unit that may be used in polygon generation, according to some embodiments. An example LSTM unit 600 is shown in isolation in FIG. 6. Each LSTM unit may have a cell 610 which has a state $c_t$ at time t. The cell may function as a memory unit. Access to this memory unit for reading or modifying may be controlled through sigmoidal gates, for example, input gate $i_t$ 620, forget gate $f_t$ 630 and output gate $o_t$ 640. In some embodiments, the LSTM unit may operate as follows. At each time step it may receive inputs from two external sources at each of the four terminals (the three gates and the input). The first source may comprise the current frame $x_t$. The second source may comprise the previous hidden states of all LSTM units in the same layer $h_{t-1}$. Additionally, each gate may have an internal source, the cell state $c_{t-1}$ of its cell block. The inputs coming from different sources may be added up, and a bias may be applied. The gates may be activated by passing their total input through the logistic function. The total input at the input terminal may be passed through the tan h non-linearity. The resulting activation may be multiplied by the activation of the input gate. This may then be added to the cell state after multiplying the cell state by the forget gate's activation $f_t$. The final output from the LSTM unit $h_t$ may be computed by multiplying the output gate's activation or with the updated cell state passed through a tan h non-linearity. The following exemplary update equations may summarize operations of a layer of LSTM units according to at least some embodiments:

matrices may be dense. tan h is the hyperbolic tangent function. Note that the cell state $c_t$ in an LSTM unit may sum activities over time. Since derivatives distribute over sums, the error derivatives do not vanish quickly as they get sent back into time. This makes it easy to do credit assignment over long sequences to discover long-range features using LSTMs in various embodiments.

Figure 5C:
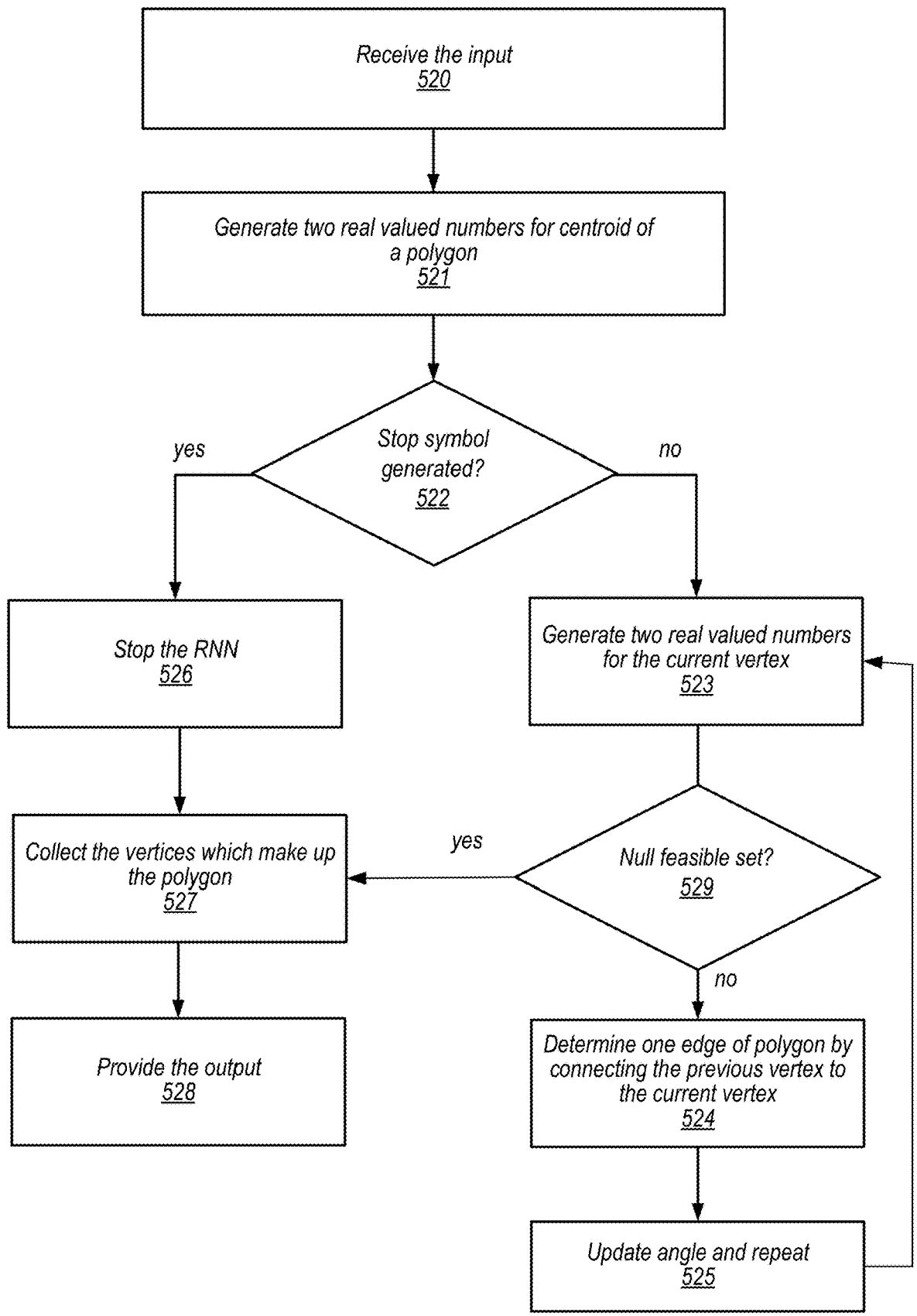
FIG. 5C is a flow diagram illustrating aspects of operations of a recurrent neural network used for polygon generation, according to some embodiments.

In some embodiments, after taking the gated image 502 and using the MCC-DNN to determine the activation of the layer just before the recurrent connections 508 in FIG. 5A, the recurrent connections 508a-m in FIG. 5B allow the model to output one edge 516 of the polygon at a time until a "stop" token is produced. In some embodiments, the weights (or parameters) of the recurrent connections 508a-m may be tied (and equal) for all time steps. FIG. 5C is a flow diagram illustrating aspects of operations of a recurrent neural network used for polygon generation, according to some embodiments. The corresponding pseudo-code is provided in pseudo-code section 1.

As shown in element 520 of FIG. 5C, input for polygon generation may be obtained from the MCC-DNN activation in the depicted embodiment. Two real-valued numbers may be generated representing the centroid of a polygon (element 521), and a parameter representing a current angle may be set to 0. If a STOP symbol is generated, as detected in operations corresponding to element 522, the operations of the recurrent neural network may be terminated (element 526), the vertices making up the polygon may be collected and output comprising the location and sides of a convex polygon may be generated (elements 527 and 528).

---

Pseudo-code section 1: polygon generation

INPUT (element 520 of FIG. 5C): MCC-DNN layer activation before the recurrent connections
OUTPUT (element 528): Location and sides of a convex polygon
    Step 1 (element 521): Generate two real valued numbers for the centroid of the polygon: x, y.
    Set current angle to be 0 radians.
    Step 2:
      IF a stop symbol is generated (element 522): Stop the RNN (element 526), and GOTO Step 5 (element 527).
      ELSE:
        Step 3 (element 523): Generate two real valued numbers: change in angle and radius from centroid.
          The change in angle is the change of angle from the previous angle in counter clockwise direction. Radius from centroid is the distance from the centroid of the polygon.
          The two values generated must satisfy the convex polygon property. If the radius is too big or too small for convexity, then the value will be projected to the closest value in the feasible set.
          Given a generated change in angle and radius, a new vertex is obtained. GOTO Step 5 when the feasible set is the null set (element 529).
        Step 4 (element 524): The line connecting the previous vertex to the current vertex is one edge of the polygon.
        Update the angle and repeat Step 2 (element 525).
    Step 5 (element 527): The collection of the vertices makes up the convex polygon.

---

$$i_t = \sigma(W_{xi}x_t + W_{hi}h_{t-1} + W_{ci}x_{t-1} + h_i) \quad (8)$$

$$f_t = \sigma(W_{xf}x_t + W_{hf}h_{t-1} + W_{cf}x_{t-1} + h_f) \quad (9)$$

$$c_t = f_t c_{t-1} + i_t \tan h(W_{xc}x_t + W_{hc}h_{t-1} + h_c) \quad (10)$$

$$o_t = \sigma(W_{xo}x_t + W_{ho}h_{t-1} + W_{co}x_{t-1} + h_o) \quad (11)$$

$$h_t = o_t \tan h(c_t) \quad (12)$$

$W_c$ matrices referenced in equations (8)-(11) may be diagonal in the depicted embodiment, whereas the rest of the If a STOP symbol is not generated, two real valued numbers for a current vertex may be generated (element 523). It may be the case that a feasible set for the new vertex is a null set (as detected in element 529), in which case the vertices that make up the polygon may be collected (element 527) and the output may be provided. If the feasible set is not null, an edge of the polygon may be generated by connecting the current vertex with a previous vertex (element 524) in the depicted embodiment. The angle may be updated and the next vertex may be generated (element 523).

Module III: Polygon ROI Temporal Prediction and Tracking

Figure 7:
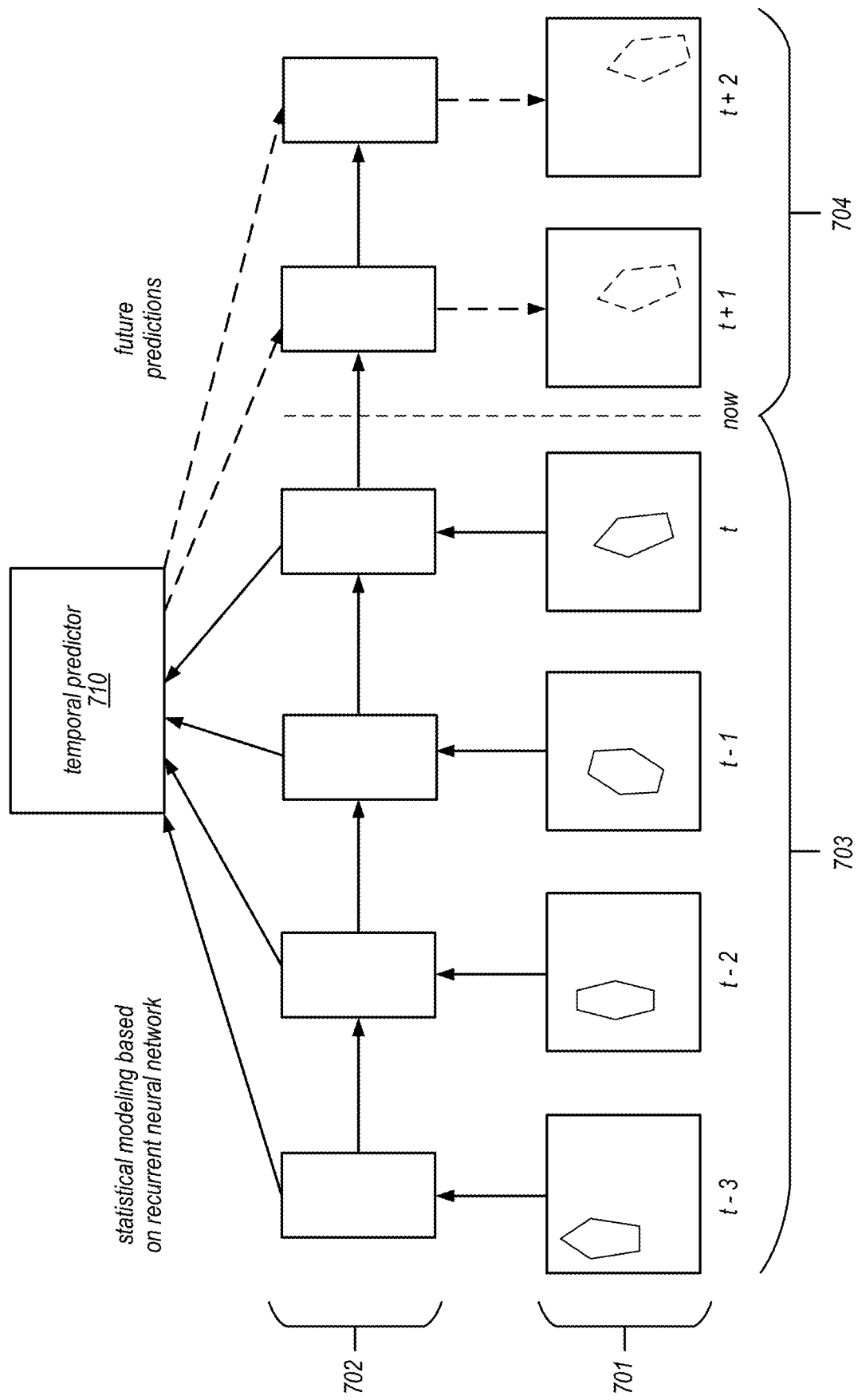
FIG. 7 illustrates an example flow of processing for polygon temporal tracking and future prediction, according to some embodiments.

FIG. 7 illustrates an example flow of processing for polygon temporal tracking and future prediction, according to some embodiments. In some embodiments, given the MCC-DNN detections of polygons at each time step from Module II, a statistical auto-regressive model may be formulated to model the motion and dynamics of polygons. In one implementation, such a model may operate at an example temporal frequency of 2 Hz (taking input at 500 millisecond intervals) and make a Markov assumption. At every time step, the system may receive the current data of a polygon 701, including the location of the polygon and its vertices, and provide the data as input into a model 702. In some embodiments, the model structure may be similar to that of the recurrent neural network described above for polygon detection, but with different input representations. By observing the polygon for one or more past time steps 703 (e.g., t−3, t−2, etc.) using the recurrence connections, Module III may forward simulate the future position trajectory and size changes of each polygon in the scene. For example, the predicted future position, velocity, and more generally the movement of the polygons may be provided as output 704 with respect to one or more future frames in the depicted embodiment. This process may be performed for all detected polygons in various embodiments.

In some embodiments, with reference to FIG. 7, the vertices of the polygon may undergo a linear transformation with a weight matrix followed by a nonlinear activation, for example, using ReLU activation. The resulting vector may comprise a hidden vector. The hidden vector at time t may be multiplied with another weight matrix to generate the hidden vector at time t+1. During time steps 703 in the depicted scenario, the polygons corresponding to t−3 to t may be provided by the MCC-DNN. Starting in times 704, the polygon may not be provided by the MCC-DNN, but rather may be generated by the hidden vectors at time t+1 and time t+2, respectively. In some embodiments, the computations to output these future predictions may be similar to the computation described in connection with FIG. 5B above. In some embodiments, to compute the polygon at time t+2, the generated polygon from time t+1 may be treated by the system as an additional input from the past. For example, in computing the polygon at time t+2, the "now" boundary between 703 and 704 may be shifted to the right.

Module IV: Object-of-Interest Identity Database

Figure 8:
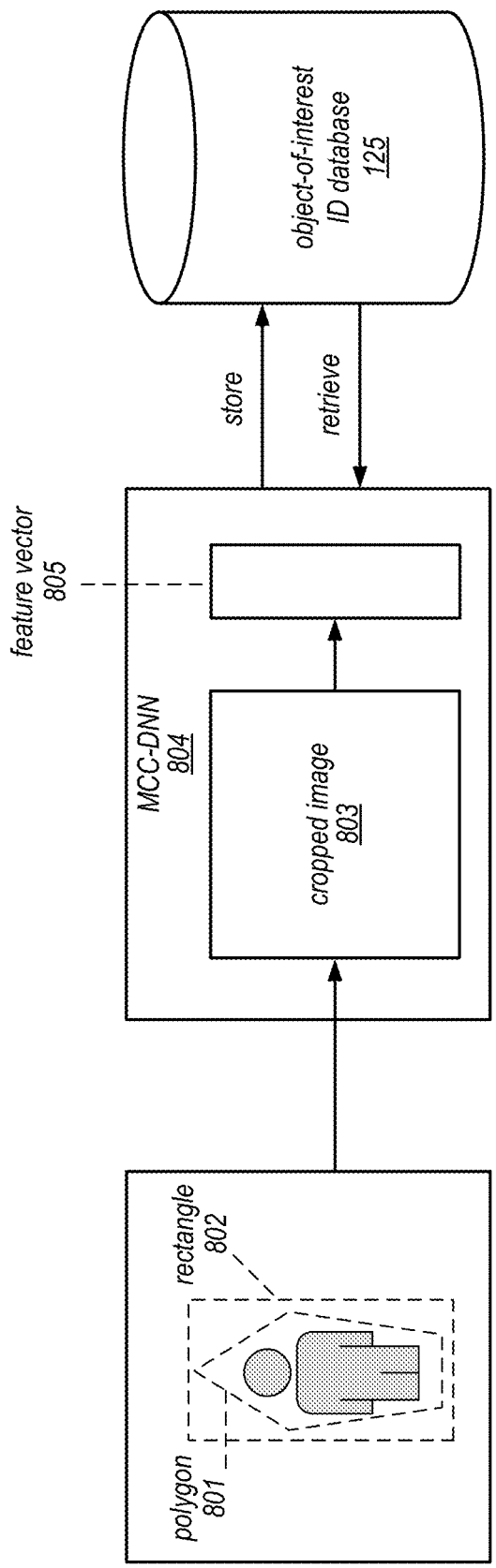
FIG. 8 illustrates an example flow of processing for storing and retrieving data to and from a region of interest (ROI) identity database, according to some embodiments.

FIG. 8 illustrates an example flow of processing for storing and retrieving data to and from a region of interest (ROI) identity database, according to some embodiments. In one embodiment, such processing may be performed by a separate ROI database module (e.g., module 126 of FIG. 1A). In some embodiments, the system may assign a unique identifier to each region-of-interest. For example, a feature vector representing a face or an object identified in an environment of a vehicle may be associated with or used as a unique identifier in various embodiments. Such unique identifiers may of course differ for different objects, while being as similar as possible for the same object across time in some embodiments. To convert a polygon region-of-interest (ROI) into a unique feature vector, the computing system may first automatically generate a rectangle 802 which encloses the polygon 801 in the depicted embodiment. This rectangle may be used to crop the image. The cropped image 803 may be provided as input into another separate MCC-DNN 804. In some embodiments, the cropped image may have, for example, an input size of 128 by 128. The MCC-DNN 804 may be trained in an unsupervised manner to reproduce its input, in an encoding-decoding architecture. The activation of the middle layer (e.g. 64 dimensions) of the MCC-DNN 804 may comprise a feature vector 805 that can be used to represent the ROIs.

In some embodiments, a multi-dimensional feature vector 805 may comprise a semantic code that is real-valued and can be stored into the database 125 and later be retrieved to compare against other codes. The codes may be assigned such that codes of the same object/person from different video frames in time are nearby in a Euclidean code space (e.g., a 64-dimensional space), whereas the codes for polygons representing different objects have much higher Euclidean distance. In various embodiments, entries may be extracted from the database 125, to reproduce the desired polygon 801 and the image data therein—that is, the database contents may be used to uniquely recreate the image or other sensor data of interest.

Module V: High Resolution Attention Focus

As discussed above, modules I, II, and III of the sensor data analysis system may operate to provide detection of the regions-of-interest in the form of the convex polygons in various embodiments. These modules may also provide an estimate of the future location and size changes of each detected polygon in the sensor data. In at least some embodiments, Module IV may provide a way to encode any given polygon into a multi-dimensional semantic code (e.g. a feature vector with 64 dimensions), based on the image appearance of the polygon as discussed above.

In some embodiments, Module V may interact with various control systems to focus on one or more objects in the video data (or other sensor data), e.g., based on the identified polygons and predicted future movements. In various embodiments, Module V may comprise a high-resolution attention focus module 124 (shown in FIG. 1A), which controls the pan, tilt, and zoom ability of a camera system 101 so that various polygon ROIs are zoomed into and high-resolution frames are captured for future analysis or immediate action.

In some embodiments, Module V may comprise a controller on an autonomous vehicle. The controller may be for example a sensor controller that controls the pan, tilt, and zoom ability of a sensor. In some embodiments, the controller may be a motion selector or other decision component, which controls the motion of the vehicle. For example, the motion selector may take a stream of video frames of a road scene, and intelligently track various objects-of-interest as they move relative to the vehicle. In one embodiment, for example, a traffic light detected in a video stream may be focused on as the vehicle moves. If the sensor data analysis system on the vehicle detects a change in the state of the traffic light, the decision component may send different motion directives to the motion control subsystem in such an embodiment.

In various embodiments, given the output of Module III and IV, Module V may optimize a schedule, e.g., using the optical zoom and pan tilt feature of a camera or the capabilities of various sensor controllers, to sequentially (e.g. serially) focus on multiple objects-of-interest (polygons) over a sequence of frames.

Figure 9B:
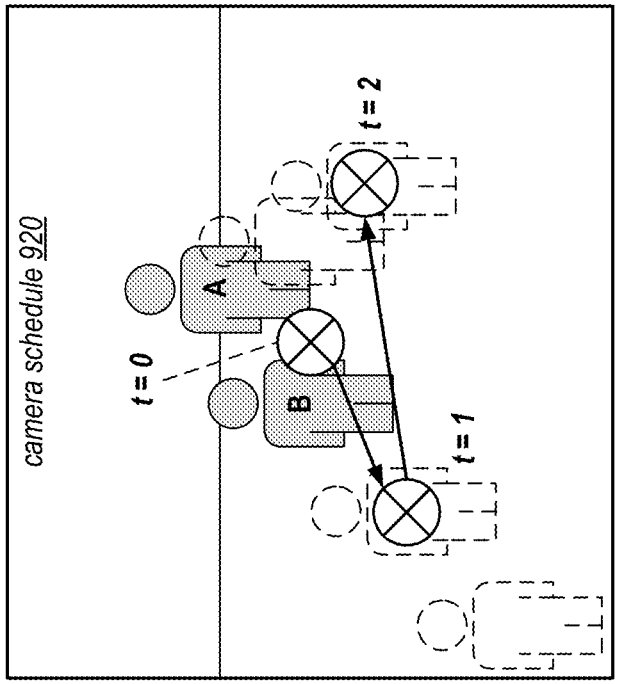
FIGS. 9A and 9B illustrate examples of scheduling the movements of a camera based on detected objects and object velocities, according to some embodiments.
Figure 9A:
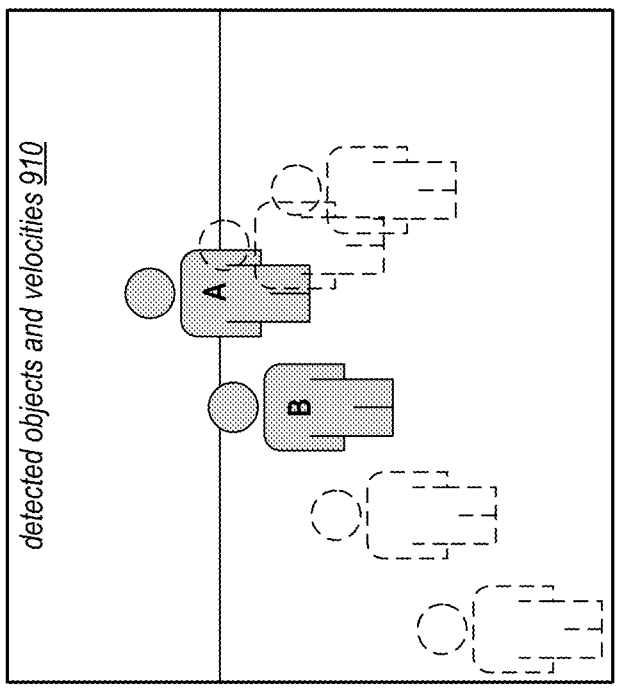

FIGS. 9A and 9B illustrate examples of scheduling the movements of a camera based on detected objects and object velocities, according to some embodiments. Initially, in FIG. 9A, the camera may be centered. Modules I and II may detect two persons of interest A and B in the first image 910. The scheduler may take as its input two polygons that are detected in the scene along with their estimated velocity vectors from Module III, and may use these to estimate how fast each person is moving. The system may then find the best sequence of movements for the camera zoom into or focus on the objects-of-interest in the scene. In the depicted example scenario of FIG. 9B, as indicated by camera schedule 920, the camera may first zoom onto person B, before attending to person A.

Figure 10A:
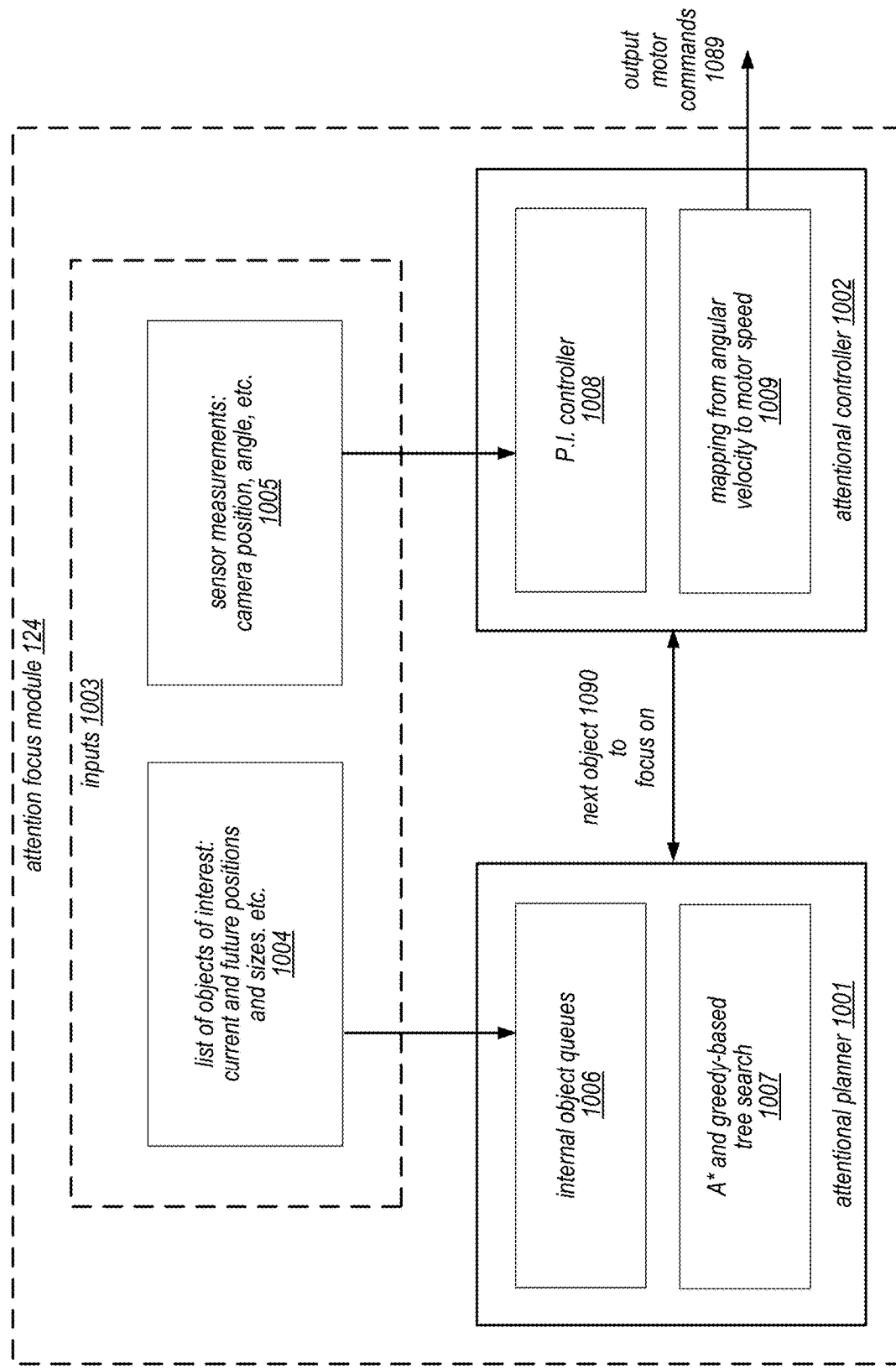
FIG. 10A illustrates an example flow of processing for determining attention focus of one or more cameras, according to some embodiments.

FIG. 10A illustrates an example flow of processing for determining attention focus of one or more cameras, according to some embodiments. As shown in FIG. 10A, an attention focus module 1077, which may be implemented on one or more computing devices such as the servers shown in FIG. 1A or a sensor controller, may comprise at least two components in the depicted embodiment: an attention planner 1001 and an attention controller 1002. The attention planner 1001 may, for example, determine the optimal order in which to traverse a set of objects of interest at a selected frequency. In some embodiments, new plans for object traversal may be computed at regular intervals, for example every second. Given one or more target objects to zoom into or focused on, the attention controller 1002 may compute the motor or actuator commands to output at another selected frequency. In one implementation, for example, traversal plans may be generated by the attention planner every N milliseconds, while actuator/motor commands may be issued every P milliseconds, where P is less than N.

As illustrated, input 1003 to the attention focus module may be in the form of detected polygons along with estimated future position trajectories in various embodiments. Input 1003 may for example comprise a list of objects of interest, their current and future positions and sizes 1004, which may be provided by an MCC-DNN as described above. In some embodiments, camera sensors (and/or other types of sensors) may provide sensor measurements 1005 as additional input to the attention focus module, including for example a camera's current position and angle. In the depicted embodiment, the attention controller may include, for example, a proportional-integral (PI) controller subcomponent 1008, as well as a subcomponent 1009 for mapping angular velocity to motor speeds. In some embodiments, the attention planner may store information about objects of interest in a set of internal object queues 1006, and a tree search algorithm similar to the A* algorithm may be used to perform a greedy search 1007 to identify the next object 1090 on which focus or zoom should be directed. The attentional planner 1001 may interact with the controller 1002 to compute the motor or actuator speed commands 1089, which may be provided to cameras or other sensors.

Module V—Attentional Planner

Figure 10B:
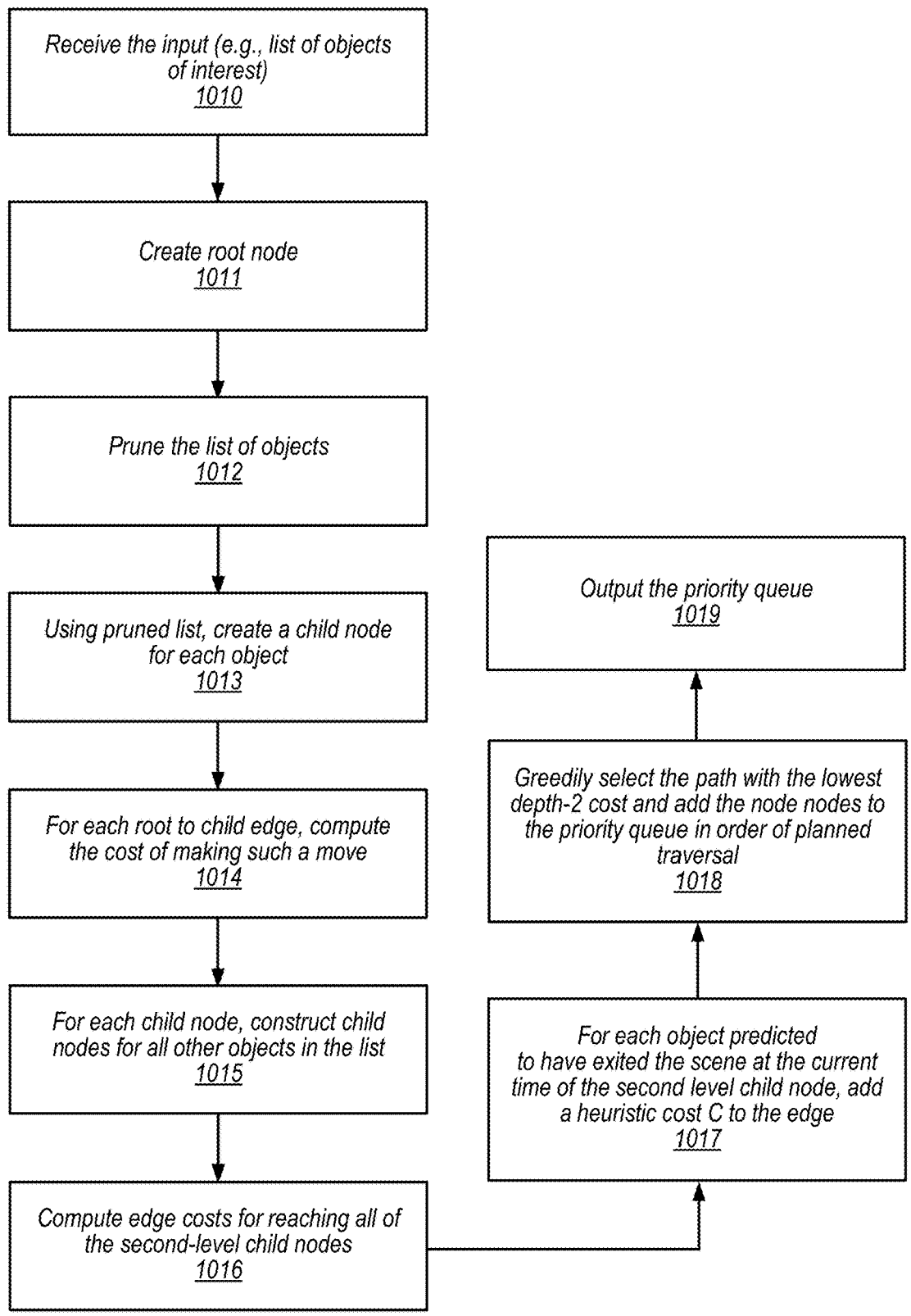
FIG. 10B is a flow diagram illustrating aspects of operations which may be performed with respect to attentional planning for a camera, according to some embodiments.

In some embodiments, a goal of the attention planner 1001 may comprise centering and/or focusing a camera onto every polygon before the polygon leaves a scene. In one embodiment, the problem may be formulated as a graph based search problem, where the nodes in the graph represent the state of the environment being analyzed. FIG. 10B is a flow diagram illustrating aspects of operations which may be performed with respect to attentional planning for a camera, according to some embodiments. The corresponding pseudo-code is provided in pseudo-code section 2. In the embodiment depicted in FIG. 10B, a hybrid combination of a greedy search with depth of 2 and an A* informed search may be employed.

As indicated in element 1010, input comprising a list of objects of interest and their respective predicted positions/locations may be obtained in the depicted embodiment at the attention planner. A root node of a tree with the current camera parameters (such as an angle of orientation of the camera, optical zoom settings and the like) may be created (element 1011). The list of objects may be pruned (element 1012), e.g., by matching/comparing their semantic codes to those in an object-of-interest identity database in some embodiments. Objects with semantic codes which differ by less than a selected threshold $\in$ from previously-examined objects may be considered to have already been visited in some embodiments, and may be removed. A child node may be created for each of the objects which remain after pruning (element 1013). For each root to child edge, the cost of making a corresponding move may be computed or estimated in at least some embodiments (element 1014). In some embodiments, the cost of an edge may be based on the time it takes to move from the current camera position to the location of the next unvisited polygon. If such a move is infeasible due to the velocity of the object and/or the angular velocity of the camera, the cost may be set to infinity (or some very high value) in various embodiments.

Pseudo-Code Section 2: Attentional Planner
INPUT (element 1010 of FIG. 10B): List of objects-of-interest in the scene and their predicted location and size in the future (e.g. 1 to 2 seconds)
OUTPUT (element 1019): A priority queue for zooming into objects-of-interest.
GRAPH NODES: State space for each graph node consists of the current camera parameters and a list of unvisited polygons in the scene
  Step 1 (element 1011): Create a root node with camera parameters (e.g., view angles, optical zoom parameters).
  Step 2 (element 1012): Prune the list of objects by matching the semantic codes to those in the Object-of-Interest Identity Database. Codes which are less than a threshold of E from existing entries in the gallery have been visited and can be removed.
  Step 3 (element 1013): Using the provided list of objects-of-interest, create one child node for each object.
  Step 4 (element 1014): For each root to child edge, compute the cost of making such a move. If the move is impossible, the cost is infinite.
  Step 5 (element 1015): For each child node, construct child nodes for all other objects-of-interest in the list.
  Step 6 (element 1016): Compute the edge costs for reaching all the second-level child nodes. This has complexity $O(N^2)$, where N is the number of objects in the scene.
  Step 7 (element 1017): For every object that has been predicted to have exited the scene at the current time of the second-level child node, add a heuristic cost C to the edge. This heuristic is admissible as it is never an overestimate of the actual cost.
  Step 8 (element 1018): Greedily select the path with lowest depth-2 cost. Add the two nodes to the priority queue in order of planned traversals.

With respect to each child node, additional child nodes corresponding to one or more other objects-of-interest in the list may be constructed (element 1015) in the depicted embodiment. The edge costs for reaching the second-level child nodes may be computed (element 1016). This has complexity $O(N^2)$, where N is the number of objects being considered. For every object that has been predicted to have exited the scene at the current time of the second-level child node, a heuristic cost C may be added to the edge cost in at least some embodiment (element 1017). A path with the lowest depth-2 cost may be selected (element 1018) and the two nodes corresponding to that path may be added to the priority queue in order of planned traversal in various embodiments. The priority queue may be provided as output (element 1019).

Module V—Attentional Controller

Pseudo-Code Section 3: Attentional Controller

INPUT (element 1030): State of the camera parameters, current and predicted location of the object-of-interest OUTPUT (element 1037): Motor speed and optical focus commands Set variable Total Error E←0

WHILE zoom criterion not met DO (block 1031)

Step 1 (element 1032): Computed error e is set as the distance between desired camera angle and the current camera angle.

Step 2 (element 1033): Add current error to Total Error: E←E+e

Step 3 (element 1034): The angular speed is computed as: u(t)←K1*e+K2*E, where K1 and K2 are constants.

Step 4 (element 1035): A one-to-one mapping between camera angular speed and the speed control signal for each of the motors is used for sending motor speed signals to the camera controller(s) or microcontroller(s).

END WHILE

Step 5 (element 1036): Remove object from list of nodes, invoke attentional planner for zooming into a new object.

Figure 10C:
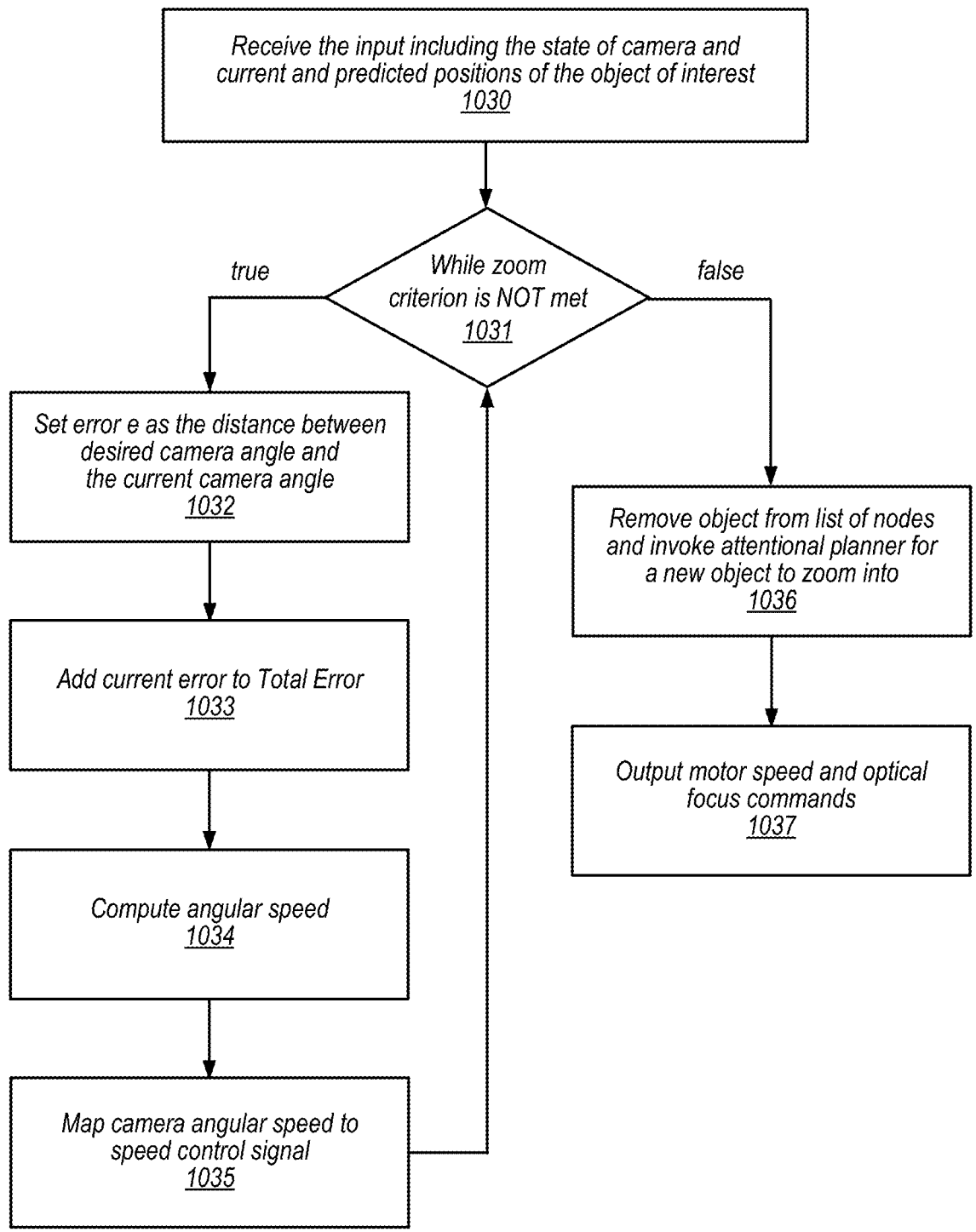
FIG. 10C is a flow diagram illustrating aspects of operations for controlling an attention-focusing camera, according to some embodiments.

In some embodiments, an attention controller 1002 may be responsible for generating a series of motor commands or actuator commands to one or more sensors based on the output of the attention planner. FIG. 10C is a flow diagram illustrating aspects of operations for controlling an attention-focusing camera, according to some embodiments. The corresponding pseudo-code is shown on pseudo code section 3. The input (as indicated in element 1030) may for example comprise the state of a camera and current and predicted positions of some number of objects of interest, while the output may comprise a set of motor or actuator commands, including for example zoom commands. In an initialization step, the total error may be set to zero. As indicated in element 1031, one or more iterations of a while loop may be performed in the depicted embodiment until a zoom criterion is met. The zoom criterion may differ depending on the embodiment. For example, in some embodiments, when the object of interest occupies 256x256 pixels in the image space of the camera with the help of the optical zoom, the criterion for zooming may be deemed to be satisfied. In other embodiments, if the long side (e.g. either height or width) of the object of interest becomes 256 pixels, the zoom criterion may be deemed to have been met. In other embodiments, different target image sizes may be used other than 256x256 pixels. In some embodiments, a proportion-integral (PI) controller 1008 may be used for determining motor/actuator movements. Other types of controllers may be used for the actuators or motors in various embodiments.

As shown in element 1032, within an iteration of the while loop, a computed error e may be set as the distance between desired camera angle and the current camera angle in the depicted embodiment. The current error may be added to the total error (element 1033), and the angular speed may be computed (element 1034). A one-to-one mapping between camera angular speed and the speed control signal for each of the motors may be generated and used for sending motor speed signals to the camera controller(s) or microcontroller(s) (element 1035). The next iteration of the while loop may then be initiated unless the zoom criterion has been met. After the zoom criterion is met, the object which was the target of the zoom may be removed from the input list (element 1036), and the attentional planner may be invoked to provide the next object of interest. The motor commands may be transmitted to the targeted controllers or microcontroller (element 1037) in the depicted embodiment.

Figure 11:
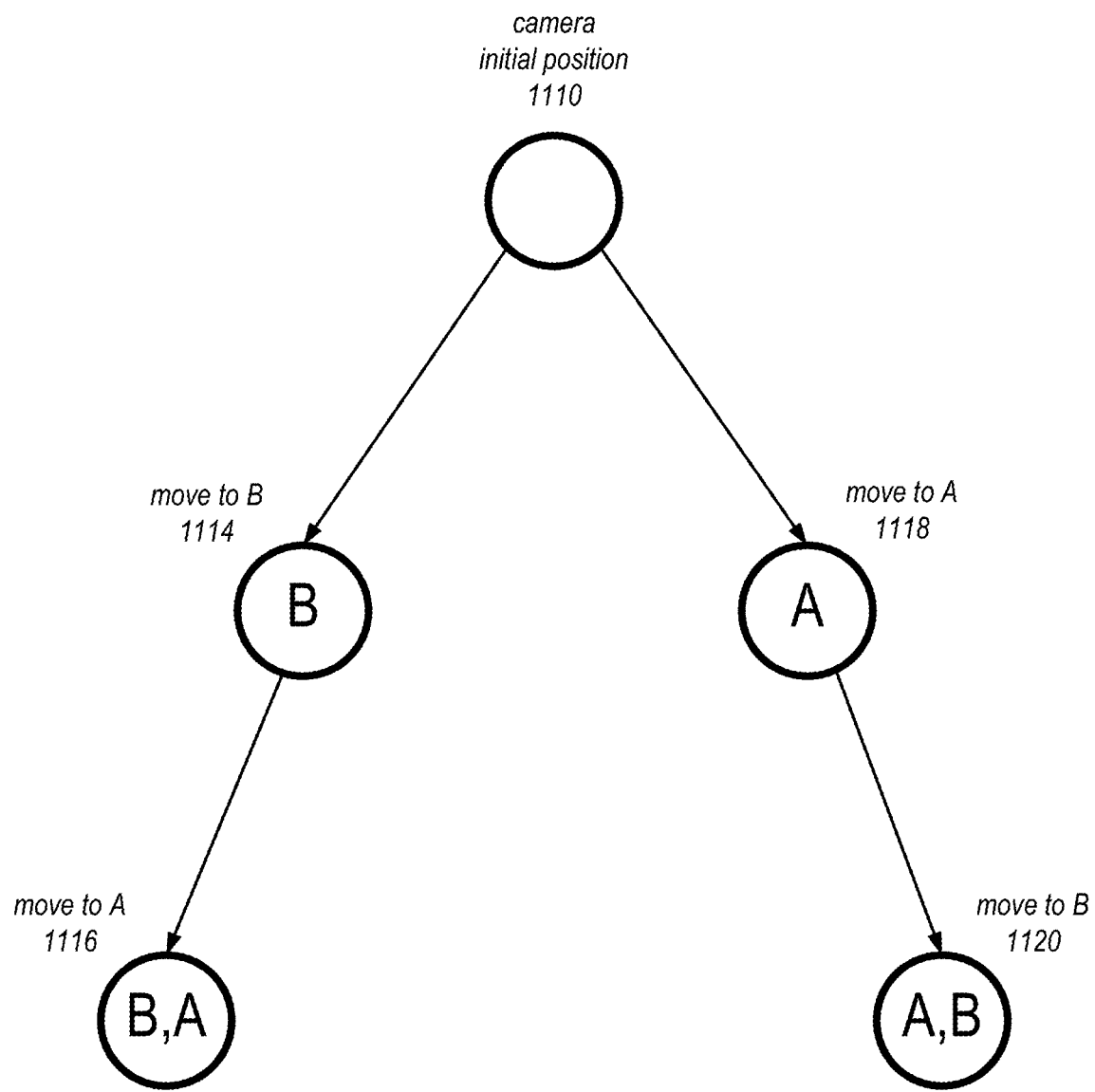
FIG. 11 illustrates an example search tree that may be used to plan actions of an attention-focusing camera, according to some embodiments.

FIG. 11 illustrates a search tree that may be used to plan control actions for an attention-focusing camera, according to some embodiments. Each node in the search tree or graph may represent a state in the depicted embodiment, including for example the camera orientation or viewing angle, elevation, and zoom information. A node may also contain the order of the polygons of interest which have been visited so far in at least some embodiments. Each level of the search tree path may, for example, represent a completion of a zooming task that either ends in success or failure. The edges may represent the cost that would be incurred by moving from the parent node to the child node associated with the edge. For example, the cost may be high for long pan and tilts, while the cost may be low for fast small adjustments of the camera to the nearby polygons. In the depicted embodiment, a camera's initial position is indicated by the root node 1110. A path comprising nodes 1114 and 1116 may represent a plan in which first an object B is zoomed on, followed by object A, while a path comprising nodes 1118 and 1120 may represent a plan in which A is zoomed on before B.

The planning task may involve solving an optimization problem to find an order of polygons to traverse so as to minimize a cost function in various embodiments. The cost function may take into account the time it takes to physically pan tilt and zoom onto the polygon object-of-interest. In some embodiments, the physical constraints of the camera, e.g. whether or not it is at all possible to physically make the move may be considered as well. In the case that a move is physically impossible, the edge cost may be set to a very high value representing infinity in some embodiments. The planning of camera motor state changes may represent an example of a model-based reinforcement learning problem with fully observed states in at least some embodiments.

Figure 12:
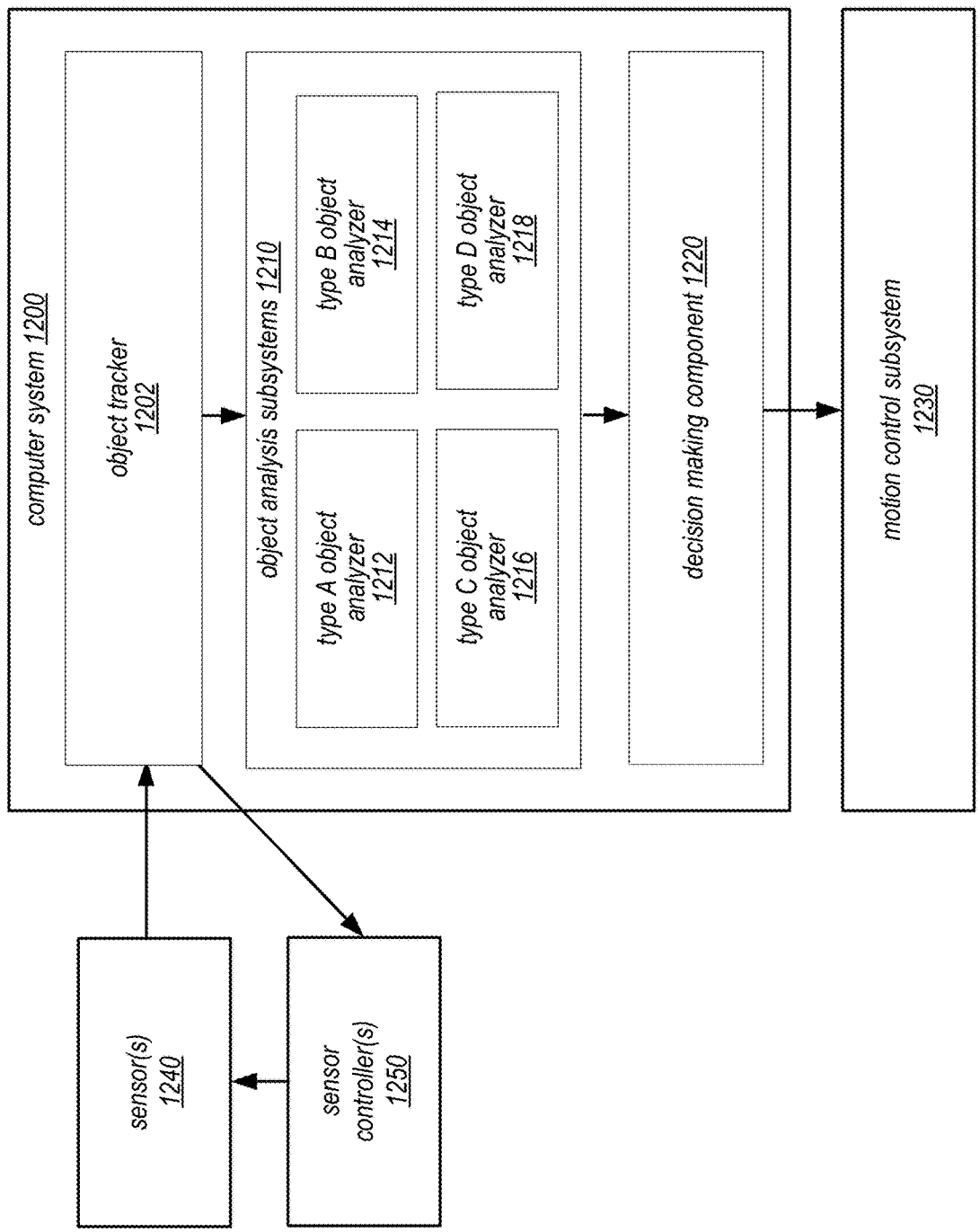
FIG. 12 illustrates an example computer system of a movable device at which sensor data may be analyzed using neural networks, according to some embodiments.

FIG. 12 illustrates an example computer system of a movable device (e.g. an autonomous vehicle) at which sensor data may be analyzed using neural networks, according to some embodiments. As shown, computer 1200 may be configured with a plurality of modules. For example, the computer 1200 may include an road object tracker 1202. Object tracker 1202 may include for example the MCC-DNN discussed in previous figures. In some embodiments, the object tracker 1202 may implement all or some combination of Modules I to IV discussed previously.

In some embodiments, the object tracker 1202 may detect objects on the road, continuously generate polygons for these objects, and continuously track and predict the movements of these object relative to the vehicle, which may itself be moving. In one embodiment, the road object tracker may perform a classification task, which determines the general type of each object, which may be associated with an object type indicated in the ROI or object-of-interested database. Examples of road object types may include, among others, a road (i.e. drivable region), lanes and lane markers, other vehicles, pedestrians, road obstructions, traffic signals, road signs, buildings and landmarks, etc. Such data may be provided as input to various object analysis subsystems 1210 of the vehicle as data objects, e.g., via an API in the depicted embodiment. In some embodiments, object analysis subsystems 1210 may simply be portions of the same neural network(s) that implements the object tracker 1202. In some embodiments, the object analysis subsystems 1210 may be downstream neural networks that are separate from the object tracker network, and may only receive a small portion of a video frame or other groups of sensor data as input. As shown, the object analysis subsystems 1210 may include a variety of specialized subsystems or subnetworks 1212, 1214, 1216, and 1218. Such specialized subsystems or subnetworks may include a vehicle analyzer, a traffic light analyzer, a pedestrian analyzer, and a road sign analyzer. Each of these analyzers may perform specialized tasks corresponding to objects of a given type in some embodiments. For example, the traffic light analyzer may be programmed or trained to determine whether a traffic light is red, green, or yellow. A vehicle analyzer may be programmed or trained to detect and predict the speed and direction of a vehicle relative to the vehicle camera, recognize the various signals on the vehicle such as break lights and turn signals, and decipher the license plate of the vehicle.

In some embodiments, these object analysis subsystems 1210 may provide output to the decision making component 1220, which in turn may provide motion directive 142 to the motion control subsystem 1230 of the movable device. In some embodiments, the object analysis subsystems 1210 may be part of the decision making components 1220. In some embodiments, the decision making components 1220 may itself be a neural network, which may be a subnetwork of the overall network that implements Modules I to IV discussed previously.

As shown, the vehicle may include one or more sensors 1240, which in some embodiments may be movable to pan, tilt, or zoom based on commands from a sensor controller 1250. In some embodiments, the sensor controller 1250 may receive control commands from the object tracker 1202, which may implement an attentional planner as discussed previously. For example, in some embodiments, the object tracker 1202 may detect an accident on the side of the road, and move the vehicle's sensor to focus on the accident as the vehicle moves past the scene.

In some embodiments, the vehicle may include one or more vehicle displays, which may be associated with display controllers. The display controllers may be capable of controlling various aspects of the display, including for example, whether the display is active, sound controls on the display, a selection of source data for the display, and the zoom level of the display, etc. In some embodiments, the display controller may be able to switch the source of the display from a first vehicle sensor to a second vehicle sensor, etc. In some embodiments, the display controller may use data generated from the object tracker 1202 as control input. For example, in some embodiments, the vehicle may be monitoring video input from both a front camera and a back camera. In one example, when the back camera detects an object (e.g. a police car or ambulance in the rear view), the display controller may receive this information from the object tracker 1202 and cause the display controller to switch an in-cabin vehicle display to show the rear view as seen by the back camera. In some cases, the display controller may magnify the object of interest in the video (e.g., the police car or fire truck), so that the object is displayed more prominently on the vehicle display. The display controller may make the switching decision by itself, or in some embodiments, receive control commands from the vehicle's computer, based on the images provided by the vehicle's back camera. In some embodiments, the display controller may be implemented as least in part as a subnetwork of the MCC-DNN used to implement the object tracker 1202.

In some embodiments, the vehicle's sensors may be operational even when the vehicle is parked or turned off. For example, the vehicle's sensors 1240 may act as a vehicle alarm system by monitoring the vehicle's surroundings when it is parked. As another example, the sensors 1240 may act as surveillance cameras. For example, a vehicle may be parked in front of a house at night and perform periodic surveillance of the house's surroundings. In some embodiments, the vehicle's sensors may use object tracker 1202 or pedestrian analyzer to detect and track people walking around the house. If suspicious activity is determined, the vehicle may sound an alarm, or in some embodiments send a message to the vehicle's owner via an email or text.

In some embodiments, the decision making component 1220 may be configured to implement an attention focusing system of a movable device, such as an autonomous vehicle.

For example, an autonomous vehicle V may be traveling on a road. The vehicle V may be using its object tracker to track a number of objects in its vicinity. For example, vehicle V may be tracking a second vehicle in V2 in the front, and a third vehicle V3 on a lane to the right. In addition, the vehicle V may be tracking road signs such as exit sign along the road. The objects may be tracked such that their movements relative to the vehicle V are monitored. In some embodiments, each object may be identified and associated with a known object from the object database and assigned an enclosing polygon over successive video frames from a vehicle sensor, and the movements of the polygon may be tracked from frame to frame. In some embodiments, the object tracker of the vehicle V may account for the movements of vehicle V, so as to isolate the movements of the other vehicles on the road from those of vehicle V itself. In this manner, the vehicle V may accurately predict the positions of the other vehicles V2 and V3 on the road, given their current observed movements.

In some embodiments, vehicle V may in effect perceive, using its object tracking system, that vehicle V2 is moving slightly faster and veering slightly to the right. In one example scenario, vehicle V may be able predict, based on such information, that in two seconds, vehicle V2 may be in a new position on the road farther ahead of V. Similarly, vehicle V may perceive that vehicle V3 is slower relative to the vehicle V and moving relatively quickly to the right. Based on the captured information, vehicle V may be able to deduce that vehicle V3 is a truck and making a lane change to the right. Accordingly, vehicle V may predict that in two seconds, vehicle V3 may be in a new position on the road farther to the right of V. In addition, the object tracker may observe a road sign, and determine that in two seconds the sign will be in new position farther behind V. In some embodiments, the vehicle V may determine that the road sign is a stationary object, so that its position may be predicted based on the vehicle's own movements alone. In that case, the vehicle V may simply determine the position of the sign within its model of the environment based on its own movements.

In some embodiments, as discussed in connection with FIG. 12, various objects identified in the vehicle's operating environment may be further analyzed. For example, the vehicles V2 and V3 may be closely analyzed by a special module or neural network to observe the vehicle's brake lights and turn signal lights. The road sign may be closely analyzed by a special module or neural network to determine the contents of the sign in some embodiments. In this example, the vehicle V may determine that the road sign is an exit sign indicating an upcoming exit from the road.

In response to determining the exit sign, the vehicle V may determine to change lanes to make an exit from the road. The vehicle V may use another embodiment of Module V to establish a plan for a best sequence of moves to move to the rightmost lane. For example, in the figure, the vehicle V may determine that the best sequence of moves is to first accelerate and change to the middle lane in front of the vehicle V3, and then maintain constant speed and switch to the rightmost lane. Alternatively, another possible sequence of action may be to wait for one second, and then change to the right lane, without accelerating. Depending on the situation, the second alternative may be more or less desirable. For example, on the one hand, accelerating the vehicle V requires more fuel expenditure. However, on the other hand, by accelerating, the vehicle V may accomplish the desired sequence of actions more quickly, and remain a safer distance away from the truck V3. Accordingly, the latter sequence of steps may represent the best path. This planning process may be at least somewhat analogous to the planning process for moving a surveillance camera in some embodiments, as discussed in connection with FIGS. 9A, 9B, 10A, 10B, 10C, and 11. Thus, in some embodiments, the path planner may be implemented as part of the object tracker 1202 or some module on the vehicle computer, and the controller to carry out the plan may be implemented using the decision making components 1220 of the vehicle.

In this context, the planner may determine the plan based on another decision graph similar to the graph shown in FIG. 11. In this example, the nodes in the graph may represent different positional states in the road environment. For example, in this context, one node may correspond to the vehicle V traveling in the middle lane, and moving at 55 miles per hour. During planning, a search may be conducted over all paths from a current node to one or more desired destination nodes. Each edge of the graph may be associated with a cost for making the move from one state to the other. For example, in some situations, a move that requires a drastic acceleration or moving very close to another vehicle would be associated with a high cost. Based on such a graph, an adapted algorithm based on the algorithm indicated in FIG. 10B may be used to produce the best path in some embodiments. In the adapted algorithm, the path may be generalized to model multiple lane changes. In some embodiments, the planning may occur in stages (e.g., a plan to change two lanes, then make a new plan). In some embodiments, various heuristics may be added to the edge costs. For example, in the illustrated example, missing the exit or making excessively "unsafe" movements may add to the edge costs.

Once the plan is established, the decision making components 1220 may implement the plan by issuing fine grained movement directives to the vehicle's motion control subsystem 1230. For example, to implement a first step in the plan, a motion selector may cause the vehicle V to veer right while accelerating mildly, for example by an additional 3 miles per hour. In some embodiments, the decision making components 1220 may also precede the lane change by turning on a turn signal for a few seconds.

Figure 13:
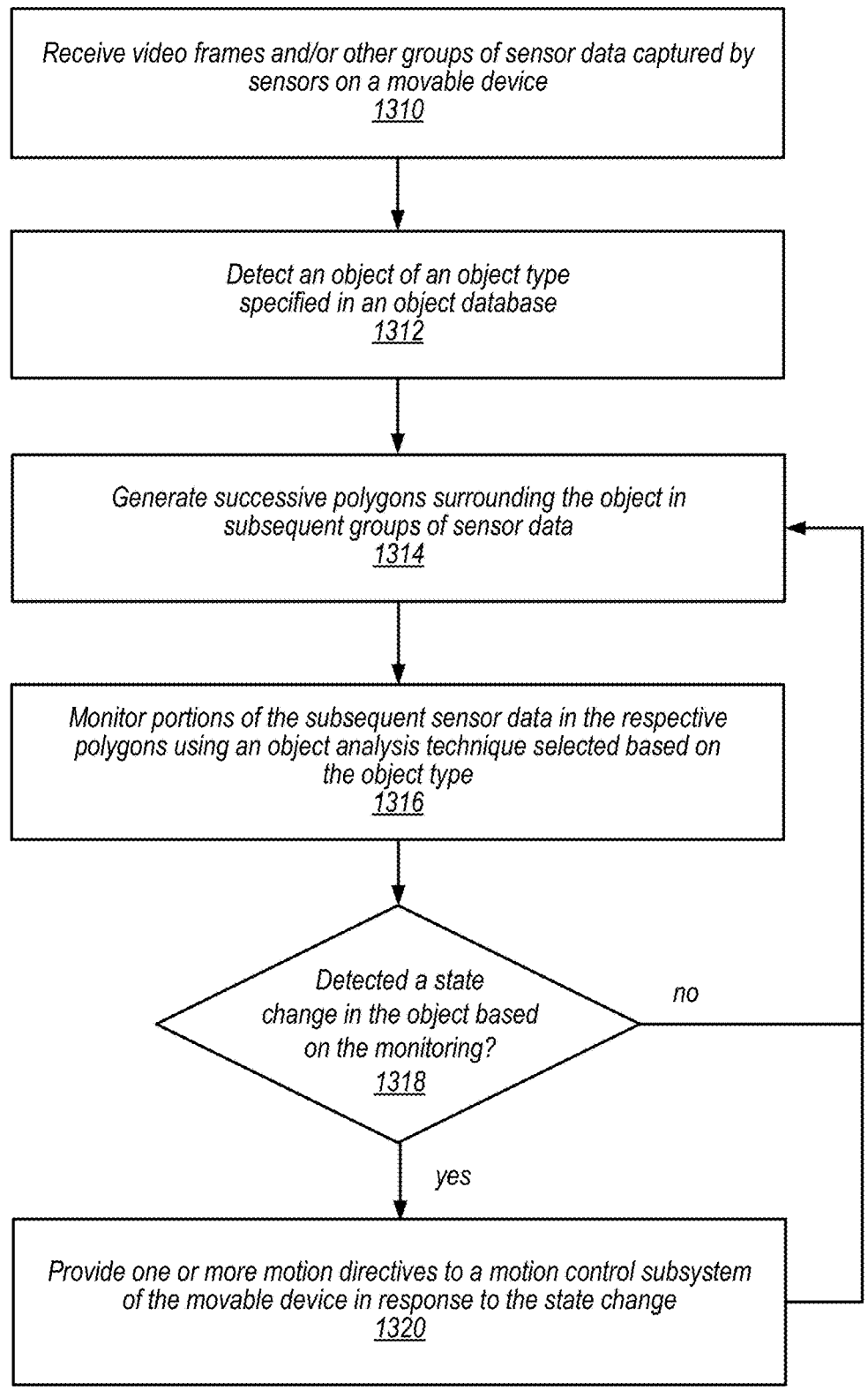
FIG. 13 is a flow diagram illustrating aspects of operations for controlling the movements of a movable device, according to some embodiments.

FIG. 13 is a flow diagram illustrating aspects of operations for controlling the movements of a movable device (e.g. an autonomous vehicle), according to some embodiments. In operations corresponding to element 1310, groups of sensor data such as video frames captured by sensors on a movable device (e.g. an autonomous vehicle) may be received. Various types of sensors may be used in different embodiments. As discussed, in some embodiments the video data may include video data captured by traditional video cameras, or successive frames of data captured by other types of sensors, such as LI DAR devices, infrared cameras, etc. The sensor data may be received by the vehicle's onboard computer, which may be tasked with making movement decisions for the autonomous vehicle based on analysis of the sensor data.

As indicated in element 1312, an object may be detected in the sensor data. The object may be identified to be a type of object specified in an object database (e.g. a database of road objects) in some embodiments. The object database may be implemented using for example an object-of-interest or region-of-interest (ROI) database 125 and associated database module 126, as discussed in connection with FIG. 8. The detection operation may be performed by the object tracker 1202 and/or Module I discussed previously. In some embodiments, the object tracker 1202 may perform a classification using a neural network to determine the type of the object. The detected object may be a road object such as another vehicle, a pedestrian, a traffic signal, a road sign, etc.

As indicated in element 1314, polygons may be generated for the object in each of subsequent video frames or other groups of sensor data. This operation may be performed by the object tracker 1202 and/or Module II discussed previously. A given polygon may, for example, be generated such that it encompasses all pixels in a video frame that are determined to contain the object. In some embodiments, the polygon may be generated using a pixelated heat map.

As indicated in element 1316, portions of the video frames or other sensor data groups within the generated polygons may be monitored using an object analysis technique selected based on the object type. This operation may be performed by a vehicle computer in various embodiments. For example, depending on the determined type of the object, one of a number of specialized analyzers may be used to continuously analyze the polygons in the successive video frames. These specialized analyzers may include for example the analyzers 1212, 1214, 1216, and 1218 discussed in connection with FIG. 12. A detected vehicle on the road may be tracked by a vehicle analyzer to monitor its movements, brake or turn light signals, etc. A traffic light may be tracked by a traffic light analyzer to monitor its state. In some embodiments, the specialized analyzers may be implemented as neural networks, which may be separate or a part of the MCC-DNN discussed previously.

As indicated in element 1318, a determination may be made whether a state change in the object is detected based on the monitoring in various embodiments. Such state changes may be determined by the specialized analyzers (e.g., analyzers 1212, 1214, 1216, and 1218) implemented on the vehicle computer in some embodiments. For example, a vehicle analyzer may detect that the brake lights of a vehicle in front of the autonomous vehicle have turned on. As another example, the vehicle analyzer may detect that the vehicle in front of the autonomous vehicle is too close to the vehicle where the analysis is being performed, given the two vehicles' traveling speeds. As yet another example, a traffic light analyzer may detect that a monitored traffic light has turned from green to yellow. These detections may all comprise a state change of the road object. In some embodiments, detected state changes may cause the analyzers to communicate with a decision making component of the vehicle (e.g. a motion selector) to determine movements for the autonomous vehicle as a result of the state changes, for example, to slow down the vehicle, avoid a collision, etc. In some embodiments, a motion selector or other decision making component may maintain a model of the autonomous vehicle's surroundings. In some embodiments, the motion selector may be implemented at least in part as a downstream neural network from the MCC-DNN.

As indicated in element 1320, one or more motion directives may be provided to a motion control subsystem of the movable device based on the prediction. This operation may be performed by a decision making component such as a motion selector. In some embodiments, the motion directives may be provided as control signals at a specified frequency to the motion control subsystem. The motion directive may include directives to accelerate, decelerate, change direction, etc. In some embodiments, the detected state changes may also cause actions to be performed by other systems on the autonomous vehicle, for example, to flash the headlights or sound the horn, etc.

Figure 14:
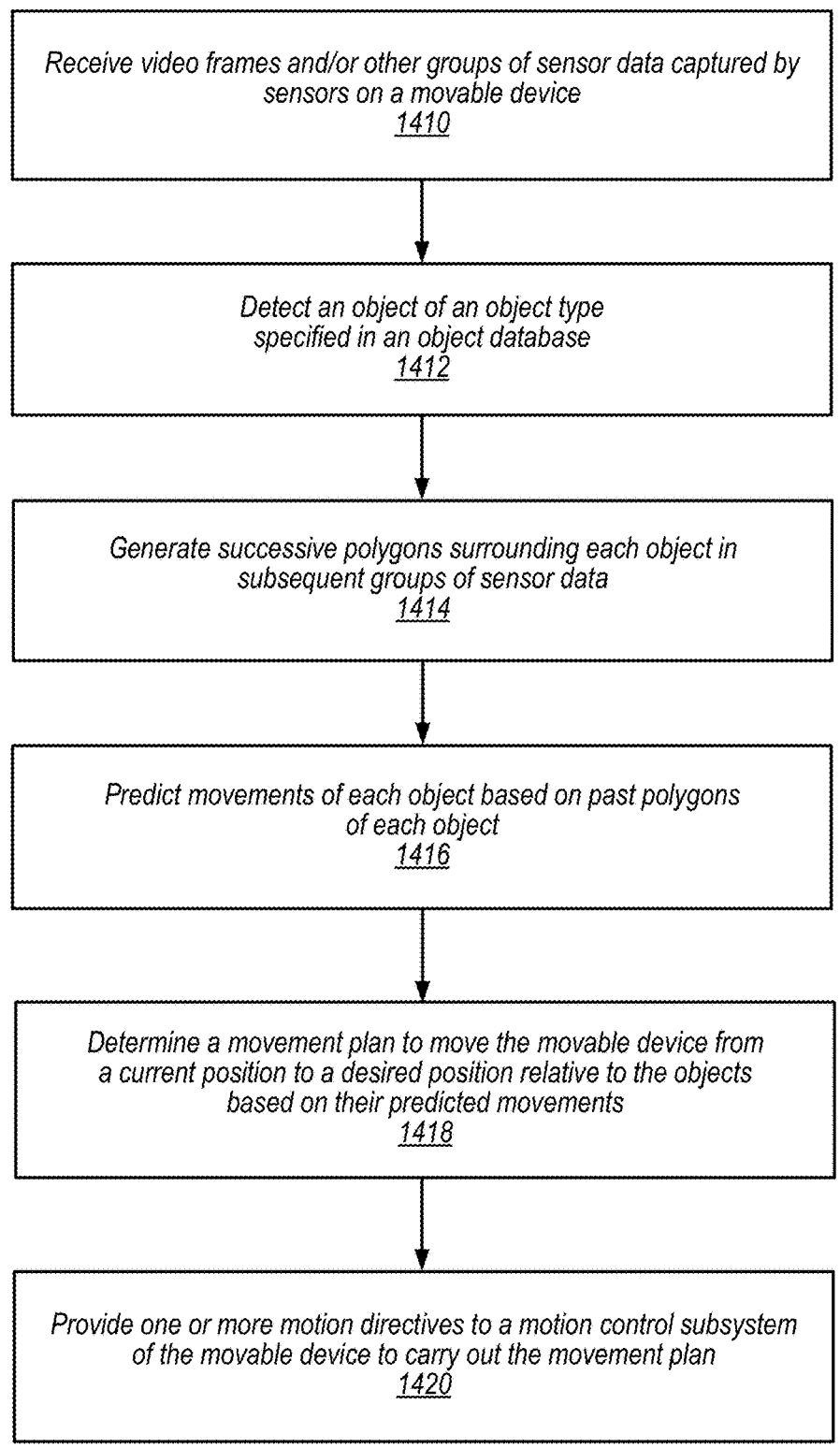
FIG. 14 is a flow diagram illustrating aspects of operations for movement planning at a movable device using an attention focusing system, according to some embodiments.

FIG. 14 is a flow diagram illustrating aspects of operations for movement planning at a movable device (e.g. an autonomous vehicle) using an attention focusing system, according to some embodiments. Operations corresponding to the first three elements of FIG. 14, (elements 1410, 1412, and 1414) may be performed in similar fashion as operations discussed above with respect to the first three elements of FIG. 13 (elements 1310, 1312, and 1314) in at least some embodiments.

A prediction of the future movements of detected objects may be determined based at least in part on the previous polygons of the objects (element 1416) in the depicted embodiment. This operation may be performed by the object tracker 1202 and/or Module III discussed previously. For example, the determination may be performed by modeling the past polygons associated with the object and then generating a future polygon for a future frame. In some embodiments, the prediction may generate multiple future polygons for multiple frames or time steps into the future. In some embodiments, such successive future polygon may be computed based in part on the predicted positions of the polygons that have not yet been observed.

In operations corresponding to element 1418, a movement plan may be determined for the movable device (e.g. autonomous vehicle), for example, from a current position to a desired position relative to the detected objects. The determination of the movement plan may be made based on the predicted movements of the road objects in various embodiments, and the determination may be performed by the object tracker 1202 (or some other module or neural network implemented on the vehicle computer) and/or Module IV discussed previously. In some embodiments, the vehicle computer may maintain a spatial model of its surroundings, including the relative positions and movements of the detected road objects. In some embodiments, the vehicle computer may generate a planning tree representing different movement plans available to the autonomous vehicle and the results of the movement plans. For example, in an example planning tree, each edge may correspond to a move by the autonomous vehicle (e.g., to accelerate past another vehicle, or change between lanes, etc.), and the nodes may represent different future positional states of the autonomous vehicle's surroundings (e.g., different positional configurations of the autonomous vehicle relative to the other cars on the road). The vehicle computer may then use the planning tree to make a determination as to the best plan to go from the autonomous vehicle's current position to the desired position. The determination may be made best on a tree search that takes into account respective cost functions associated with the edges. For example, in one scenario, the autonomous vehicle may determine that it needs to move from one lane to another lane to exit a highway. The autonomous vehicle's movement planner may determine that the move may be accomplished by a sequence of smaller movements to safely navigate through the traffic on the highway. In some embodiments, the cost function associated with each smaller movement may take into account factors such as the risk of the move (e.g., how close the move may bring the autonomous vehicle to another car, how much the move would require the autonomous vehicle to speed up or slow down, etc.) In some embodiments, the movement planner may sum the cost functions of each edge of the planning tree to determine a total cost for a plan, and select a movement plan that has the a minimum cost function.

In operations corresponding to element 1420, the one or more motion directives may be provided to a motion control subsystem of the movable device (e.g. the autonomous vehicle) to carry out the movement plan. This operation may be performed by a decision component 1220, such as a motion planner or motion selector. In some embodiments, the decision making component may include memory to store intermediate states that are needed to achieve the final desired state of the movement plan. In accordance with the plan, in one embodiment a motion selector may transmit movement directives to the motion control subsystem to take the autonomous vehicle from one intermediate state to the next, until the desired state is achieved. In some embodiments, the vehicle's movement planner may continuously update its movement plan based on additional information from new groups of sensor data such as newly acquired video frames. In some embodiments, the movement planner may change or abandon a movement plan based on new information. The decision making components may generate motion directives in accordance with the currently selected movement plan, and provide the directives to the motion control subsystem in a manner similar to operation 1320 in FIG. 13. It is noted that in various embodiments, at least some operations other than those illustrated in the flow diagrams of FIG. 4, FIG. 5C, FIG. 10B, FIG. 13 and/or FIG. 14 may be used to implement the sensor data analysis techniques described above. Some of the operations shown may not be implemented in some embodiments or may be implemented in a different order, or in parallel rather than sequentially.

Other example embodiments are provided below.

In a general example embodiment, a computing system is provided comprising: a dynamic camera device comprising a memory device and one or more processors configured to obtain video data, detect an object in a region of interest (ROI) in the video data using deep neural network computations, generate a polygon within the ROI, and predict a future movement of the polygon; and a computing device in data communication with the camera device and comprising an object of interest database, the computing device configured to receive the polygon and the future movement of the polygon from the camera device, and generate one or more commands to control movement of the dynamic camera device.

In another general example embodiment, a computing system is provided comprising: a communication device configured to receive video data that is transmittable by a video camera; a memory device configured to store the video data and an object of interest database; and one or more processors configured to at least: pre-process the video data, detect an object in a region of interest (ROI) in the video data using deep neural network computations, generate a polygon within the ROI, predict a future movement of the polygon, store the polygon in the database, and use the future movement of the polygon to output one or more commands to control movement of the dynamic camera device.

In another general example embodiment, a video camera system is provided comprising: an image sensor for capturing video data; a memory device configured to store the video data and an object of interest database; and one or more processors configured to at least: pre-process the video data, detect an object in a region of interest (ROI) in the video data using deep neural network computations, generate a polygon within the ROI, predict a future movement of the polygon, store the polygon in the database, and use the future movement of the polygon to output one or more commands to control movement of the dynamic camera device.

In a general example embodiment, a method performed by a computing system is provided. The method comprising: obtain video data via a dynamic camera device; pre-process the video data; detect an object in a region of interest (ROI) in the video data using deep neural network computations; generate a polygon within the ROI; compute a predicted future movement of the polygon; and use the future movement of the polygon to compute and transmit one or more commands to control movement of the dynamic camera device.

In a general example embodiment, a camera system is provided comprising: an image sensor for capturing video data; a memory device for storing the video data as sequence of video frames at successive time steps; and one or more processors. The one or more processors are configured to at least: generate a sequence of polygons at each of the time steps within a corresponding one of the sequence of video frames. And, for each given polygon at each given time step, the one or more processors: obtain a location and vertices of the given polygon as input into a recurrent polygon network model; output a value from the recurrent polygon network model; and use the multiple outputted values corresponding to different time steps to compute a predicted future movement of the polygon.

In an example aspect, the multiple outputted values comprise recurrence connections in the recurrent polygon network model.

In a general example embodiment, a computing system is provided, comprising: a communication device configured to receive video data that is transmittable by a video camera; a memory device configured to store the video data and an object of interest database; and one or more processors configured to at least generate a sequence of polygons at each of the time steps within a corresponding one of the sequence of video frames. The one or more processors, for each given polygon at each given time step, also: obtain a location and vertices of the given polygon as input into a recurrent polygon network model; output a value from the recurrent polygon network model; and use the multiple outputted values corresponding to different time steps to compute a predicted future movement of the polygon.

In an example aspect, the multiple outputted values comprise recurrence connections in the recurrent polygon network model.

In a general example embodiment, a method performed by a computing system is provided. The method comprising: obtaining video data recorded by a camera device; storing the video data in memory as sequence of video frames at successive time steps; and generating, via one or more processors, a sequence of polygons at each of the time steps within a corresponding one of the sequence of video frames. For each given polygon at each given time step, the method comprising: obtain a location and vertices of the given polygon as input into a recurrent polygon network model; output a value from the recurrent polygon network model; and use multiple outputted values corresponding to different time steps to compute a predicted future movement of the polygon.

In an example aspect, the multiple outputted values comprise recurrence connections in the recurrent polygon network model.

In a general example embodiment, a camera system is provided comprising: an image sensor for capturing video data; a memory device for storing the video data as video frames; and one or more processors. The one or more processors are configured to at least: pre-process a given video frame to generate a post processed image; input the post processed image into a first multi-layer cross-correlation deep neural network (MCC DNN) in order to output a heat map, the heat map comprising a binary image with each pixel having a value representing the likelihood of having an object of interest at that location; multiplicatively gate the post processed image and the heat map to generate a gated image; input the gated image into a second MCC DNN to generate a MCC DNN layer activation; input the MCC DNN layer activation into a polygon recurrent neural network (RNN) to generate a set of vertices that define a convex polygon; and compute and output the convex polygon located within the given video frame using the set of vertices.

In a general example embodiment, a computing system is provided comprising: a communication device configured to receive video data that is transmittable by a video camera; a memory device configured to store the video data as video frames; and one or more processors. The one or more processors are configured to at least: pre-process a given video frame to generate a post processed image; input the post processed image into a first multi-layer cross-correlation deep neural network (MCC DNN) in order to output a heat map, the heat map comprising a binary image with each pixel having a value representing the likelihood of having an object of interest at that location; multiplicatively gate the post processed image and the heat map to generate a gated image; input the gated image into a second MCC DNN to generate a MCC DNN layer activation; input the MCC DNN layer activation into a polygon recurrent neural network (RNN) to generate a set of vertices that define a convex polygon; compute and output the convex polygon located within the given video frame using the set of vertices.

In a general example embodiment, a method performed by a computing system is provided. The method comprising: obtaining video data recorded by a camera device; storing the video data in memory as video frames; pre-processing, using one or more processors, a given video frame to generate a post processed image; inputting the post processed image into a first multi-layer cross-correlation deep neural network (MCC DNN) in order to output a heat map, the heat map comprising a binary image with each pixel having a value representing the likelihood of having an object of interest at that location; multiplicatively gating the post processed image and the heat map to generate a gated image; inputting the gated image into a second MCC DNN to generate a MCC DNN layer activation; inputting the MCC DNN layer activation into a polygon recurrent neural network (RNN) to generate a set of vertices that define a convex polygon; and computing and outputting the convex polygon located within the given video frame using the set of vertices.

In a general example embodiment, a camera system is provided comprising: an image sensor for capturing video data; one or more actuators to control at least one of pan, tilt, and zoom affecting the image sensor; a memory device for storing the video data; and one or more processors. The one or more processors are configured to at least: analyze the video data to determine a current position of an object of interest and to determine a predicted future movement of the object of interest; use the current position, the future movement and one or more physical constraints of the one or more actuators to plan a path of movement of the camera to point at a future predicted position of the object of interest; and use the path to generate actuator commands to control the camera to point at the future predicted position of the object of interest.

In an example aspect, there are multiple objects of interest in the video data, and wherein the path is computed to traverse multiple future predicted positions of the multiple objects of interest.

In a general example embodiment, a computing system is provided comprising: a communication device configured to receive video data that is transmittable by a video camera; a memory device configured to store the video data; and one or more processors. The one or more processors are configured to at least: analyze the video data to determine a current position of an object of interest and to determine a predicted future movement of the object of interest; use the current position, the future movement and one or more physical constraints of the one or more actuators to plan a path of movement of the video camera to point at a future predicted position of the object of interest; and use the path to generate actuator commands to control the video camera to point at the future predicted position of the object of interest.

In an example aspect, there are multiple objects of interest in the video data, and wherein the path is computed to traverse multiple future predicted positions of the multiple objects of interest.

In a general example embodiment, a method performed by a computing system is provided. The method comprising: obtaining video data recorded by a camera device; storing the video data in memory; processing the video data using one or more processors to determine a current position of an object of interest and to determine a predicted future movement of the object of interest; using the current position, the future movement and one or more physical constraints of the one or more actuators to plan a path of movement of the camera to point at a future predicted position of the object of interest; and using the path to generate actuator commands to control the camera to point at the future predicted position of the object of interest.

In a general example embodiment, a computer system is provided comprising one or more processors and an associated memory, the memory storing a deep neural network, the deep neural network configured to receive sensor data captured by one or more sensors, the sensor data comprising one or more successive image frames, detect an object in the image frames, generate a plurality of polygons surrounding the object in each of the successive image frames, and generate a prediction of a future position of the object based at least in part on the plurality of polygons, and the one or more processors are further configured to provide one or more commands to a control system based at least in part on the prediction of the future position of the object.

In an example aspect, the computer system implemented so that the one or more sensors are located on an autonomous vehicle and configured to capture sensor data of a road scene, the control system comprises a motion control subsystem of the autonomous vehicle, and the one or more commands comprise motion directives to the motion control subsystem to control movements of the autonomous vehicle.

In an example aspect, the computer system is implemented such that the one or more sensors includes a Light Detection and Ranging (LIDAR) device.

In an example aspect, the computer system is implemented such that the deep neural network is configured to determine a type of the object specified in an object-of-interest database, monitor portions of the image frames in the respective polygons using an object analysis technique selected based on the object type, and detect a state change in the object based on the monitoring, and the one or more motion directives are generated based at least in part on the detection of the state change.

In an example aspect, the computer system is implemented such that the deep neural network is configured to determine the type of the object selected from a list comprising vehicle, a pedestrian, a traffic signal, or a road sign.

In an example aspect, the computer system is implemented such that the deep neural network is configured to generate predictions of respective future movements of a plurality of objects detected in the image frames, and determine a movement plan to move the autonomous vehicle from a current position to a desired position relative to the plurality of objects based at least in part on their predicted future movements, and the one or more motion directives are generated based at least in part on the movement plan.

In a general example embodiment, a method is provided. The method comprises receiving sensor data captured by one or more sensors, the sensor data comprising one or more successive image frames. The method comprises using a deep neural network: detecting an object in the image frames, generating a plurality of polygons surrounding the object in each of the successive image frames, and generating a prediction of a future position of the object based at least in part on the plurality of polygons. The method also comprises providing one or more commands to a control system based at least in part on the prediction of the future position of the object.

In a general example embodiment, a non-transitory computer-accessible storage medium storing program instructions is provided. The program instructions when executed on one or more processors cause the one or more processors to receive sensor data captured by one or more sensors, the sensor data comprising one or more successive image frames, use a deep neural network to detect an object in the image frames, to generate a plurality of polygons surrounding the object in each of the successive image frames, and to generate a prediction of a future position of the object based at least in part on the plurality of polygons, and provide one or more commands to a control system based at least in part on the prediction of the future position of the object.

It will be appreciated that any module or component exemplified herein that executes instructions or operations may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the systems, devices, and servers described herein, or accessible or connectable thereto. Any application or module herein described may be implemented using computer readable/executable instructions or operations that may be stored or otherwise held by such computer readable media.

It will also be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the computer processes, the flow charts and the diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

What is claimed is:

1. A system, comprising:
one or more processors and an associated memory, the memory storing a neural network, the neural network configured to:
receive sensor data captured by one or more sensors coupled to a movable device, the sensor data comprising one or more image frames;
detect an object in the one or more image frames, including to:
determine a probability that a portion of the object is positioned at a location in one of the one or more image frames; and
produce a post-processed image using one or more transformations of the image frame that removes one or more areas of the image frame that does not include the object;
generate a plurality of polygons surrounding the object in individual ones of the one or more image frames;
generate a prediction of a future position of the object based at least on the plurality of polygons;
generate, based at least on the prediction of the future position of the object, a plurality of movement plans, wherein a movement plan of the plurality of movement plans comprises a sequence of movements to move the movable device from a first position to a second position relative to the object;
for each of the plurality of movement plans, determine respective cost functions for individual movements of the sequence of movements; and
select a movement plan of the plurality of movement plans based on the respective cost functions for respective ones of the plurality of movement plans; and
wherein the one or more processors are further configured to provide one or more commands to a control system based at least on the selected movement plan.

2. The system as recited in claim 1, wherein to detect the object in an image frame of the one or more image frames, the neural network is configured to:
generate a heat map of an image frame, the heat map comprising a plurality of pixels, wherein individual ones of the pixels indicate a respective value representing a respective probability that at least a portion of the object is located at the pixel; and
gate a post-processed image and the heat map to remove the one or more areas of the post-processed image that do not contain the object, producing a gated image, wherein the post-processed image is obtained by performing the one or more transformations on the image frame.

3. The system as recited in claim 2, wherein to generate the polygons surrounding the object, the neural network is configured to generate a centroid and a set of vertices of a convex polygon from the gated image using a recurrent portion of the neural network.

4. The system as recited in claim 1, wherein to generate the prediction of the future position of the object, the neural network is configured to:
obtain respective centroids and sets of vertices for individual ones of the plurality of polygons; and
determine a position of a future polygon in a future image frame, based at least in part on the respective centroids and sets of vertices.

5. The system as recited in claim 1, wherein:
the one or more sensors include a video camera,
the control system comprises a controller for the video camera, and
the one or more commands instruct the video camera to move or zoom to focus attention on the object.

6. The system as recited in claim 1, wherein:
the one or more sensors are configured to capture sensor data of an environment of a vehicle,
the control system comprises a motion control subsystem of the vehicle, and
the one or more commands comprise motion directives to the motion control subsystem to control movements of the vehicle.

7. The system as recited in claim 6, wherein the one or more sensors include a Light Detection and Ranging (LIDAR) device.

8. The system as recited in claim 1, wherein the neural network is configured to:
determine, using an object-of-interest database, an object type of the object;
monitor portions of the image frames in respective polygons using an object analysis technique, wherein the object analysis technique is selected based at least in part on the object type; and
detect a state change of the object based at least in part on monitoring of the portions; and
wherein the one or more commands are generated based at least in part on the detection of the state change.

9. The system as recited in claim 1, wherein the respective cost functions are determined based on a risk of performing the individual movements.

10. The system as recited in claim 1, wherein the neural network is configured to:
generate predictions of respective future movements of a plurality of objects detected in the image frames;
wherein the movement plan to move the movable device from the first position to the second position is determined further based at least on the predictions of respective future movements.

11. A method, comprising:
  receiving sensor data captured by one or more sensors, the sensor data comprising one or more image frames;
  using a neural network:
    detecting an object in the one or more image frames, the detecting including:
      determining a probability that a portion of the object is positioned at a location in one of the one or more image frames; and
      producing a post-processed image using one or more transformations of the image frame that removes one or more areas of the image frame that does not include the object;
    generating a plurality of polygons surrounding the object in individual ones of the image frames;
    generating a prediction of a future position of the object based at least on the plurality of polygons;
    generating, based at least on the prediction of the future position of the object, a plurality of movement plans, wherein a movement plan of the plurality of movement plans comprises a sequence of movements to move a movable device from a first position to a second position relative to the object;
    for each of the plurality of movement plans, determining respective cost functions for individual movements of the sequence of movements; and
    selecting a movement plan of the plurality of movement plans based on the respective cost functions for respective ones of the plurality of movement plans; and
  providing one or more commands to a control system based at least on the selected movement plan.

12. The method as recited in claim 11, wherein detecting the object in an image frame of the one or more image frames comprises:
  generating a heat map of the image frame, the heat map comprising a plurality of pixels, wherein individual ones of the pixels indicate a respective value representing a respective probability that at least a portion of the object is located at the pixel; and
  gating a post-processed image and the heat map to remove the one or more areas of the post-processed image that do not contain the object, producing a gated image, wherein the post-processed image is obtained from the one or more image frames using the one or more transformation operations.

13. The method as recited in claim 11, wherein generating the prediction of a future position of the object comprises:
  obtaining respective centroid locations and sets of vertices for individual ones of the plurality of polygons; and
  determining a position of a future polygon in a future image frame, based at least in part on the centroid locations and sets of vertices of the plurality of polygons.

14. The method as recited in claim 11, wherein the one or more sensors are located on a vehicle and configured to capture sensor data of an environment of the vehicle, and wherein providing one or more commands to a control system comprises providing one or more motion directives to a motion control subsystem controlling movements of the vehicle.

15. The method as recited in claim 14, wherein receiving sensor data captured by one or more sensors comprises receiving sensor data from a Light Detection and Ranging (LIDAR) device of the vehicle.

16. A non-transitory computer-accessible storage medium storing program instructions that when executed on one or more processors cause the one or more processors to:
  receive sensor data captured by one or more sensors;
  use a neural network to:
    detect an object in the sensor data, including to:
      determine a probability that a portion of the object is positioned at a location in one of the one or more image frames; and
      produce a post-processed image using one or more transformations of the image frame that removes one or more areas of the image frame that does not include the object;
    generate a plurality of polygons surrounding the object in one or more subsets of the sensor data;
    generate a prediction of a future position of the object based at least on the plurality of polygons;
    generate, based at least on the prediction of the future position of the object, a plurality of movement plans, wherein a movement plan of the plurality of movement plans comprises a sequence of movements to move a movable device from a first position to a second position relative to the object;
    for each of the plurality of movement plans, determine respective cost functions for individual movements of the sequence of movements; and
    select a movement plan of the plurality of movement plans based on the respective cost functions for respective ones of the plurality of movement plans; and
  provide one or more commands to a control system based at least on the selected movement plan.

17. The non-transitory computer-accessible storage medium as recited in claim 16, wherein the one or more sensors are located on a vehicle and configured to capture sensor data of an environment of the vehicle, and wherein the one or more commands comprise one or more motion directives to a motion control subsystem of the vehicle.

18. The non-transitory computer-accessible storage medium as recited in claim 17, wherein to receive sensor data captured by one or more sensors, the program instructions when executed on the one or more processors cause the one or more processors to receive sensor data from a Light Detection and Ranging (LIDAR) device of the vehicle.

19. The non-transitory computer-accessible storage medium as recited in claim 16, wherein the program instructions when executed on the one or more processors cause the one or more processors to:
  determine a type of the object indicated in an object-of-interest database;
  monitor portions of the one or more subsets of the sensor data in the respective polygons using an object analysis technique selected based at least in part on the object type;
  detect a state change of the object based at least in part on monitoring the portions; and
  wherein the one or more commands are generated based at least in part on the detection of the state change.

20. The non-transitory computer-accessible storage medium as recited in claim 16, wherein the program instructions when executed on the one or more processors cause the one or more processors to:

generate predictions of respective future movements of a plurality of objects detected in the sensor data, wherein the movement plan to move the movable device from the first position to the second position is determined further based at least on the predictions of respective future movements.

* * * * *